United States Patent [19]

Lee

[11] Patent Number: 5,029,107

[45] Date of Patent: Jul. 2, 1991

[54] APPARATUS AND ACCOMPANYING METHOD FOR CONVERTING A BIT MAPPED MONOCHROMATIC IMAGE TO A GREY SCALE IMAGE USING TABLE LOOK UP OPERATIONS

[75] Inventor: Jack C. Lee, Yorktown Heights, N.Y.

[73] Assignee: International Business Corporation, Armonk, N.Y.

[21] Appl. No.: 331,485

[22] Filed: Mar. 31, 1989

[51] Int. Cl.$^5$ .............................................. G06K 15/00
[52] U.S. Cl. ................................... 364/518; 364/521; 340/750; 340/724
[58] Field of Search ............... 364/518, 519, 521, 522; 340/747, 750, 721, 724, 728, 734; 382/46, 44

[56] References Cited

U.S. PATENT DOCUMENTS

| | | | |
|---|---|---|---|
| 4,084,196 | 4/1978 | Tisue et al. | 358/283 |
| 4,210,936 | 7/1980 | Cinque et al. | 358/283 |
| 4,486,785 | 12/1984 | Lasher et al. | 358/284 |
| 4,533,942 | 8/1985 | Gall et al. | 358/78 |
| 4,630,125 | 12/1986 | Roetling | 358/280 |
| 4,672,559 | 6/1987 | Jansson et al. | 364/525 |
| 4,855,933 | 8/1989 | Kondo | 364/518 |

OTHER PUBLICATIONS

G. Goertzel et al., "Digital Halftoning on the IBM 4250 Printer", *IBM Journal of Research and Developing,* vol. 31, No. 1, Jan. 1987, pp. 2–15.

*Primary Examiner*—Gary V. Harkcom
*Assistant Examiner*—Phu K. Nguyen
*Attorney, Agent, or Firm*—Peter L. Michaelson

[57] ABSTRACT

Apparatus and an accompanying method for converting a relatively high resolution halftone bit-mapped monochromatic document, such as illustratively a halftone separation which exists in a CDPF print file, into a relatively low resolution continuous tone grey scale document which, when the latter is applied to a display screen of a video monitor having appropriate grey scale capability, would provide a readable displayed page, i.e. a "preview", that approximately depicts how the bit-mapped document would appear when printed.

18 Claims, 14 Drawing Sheets

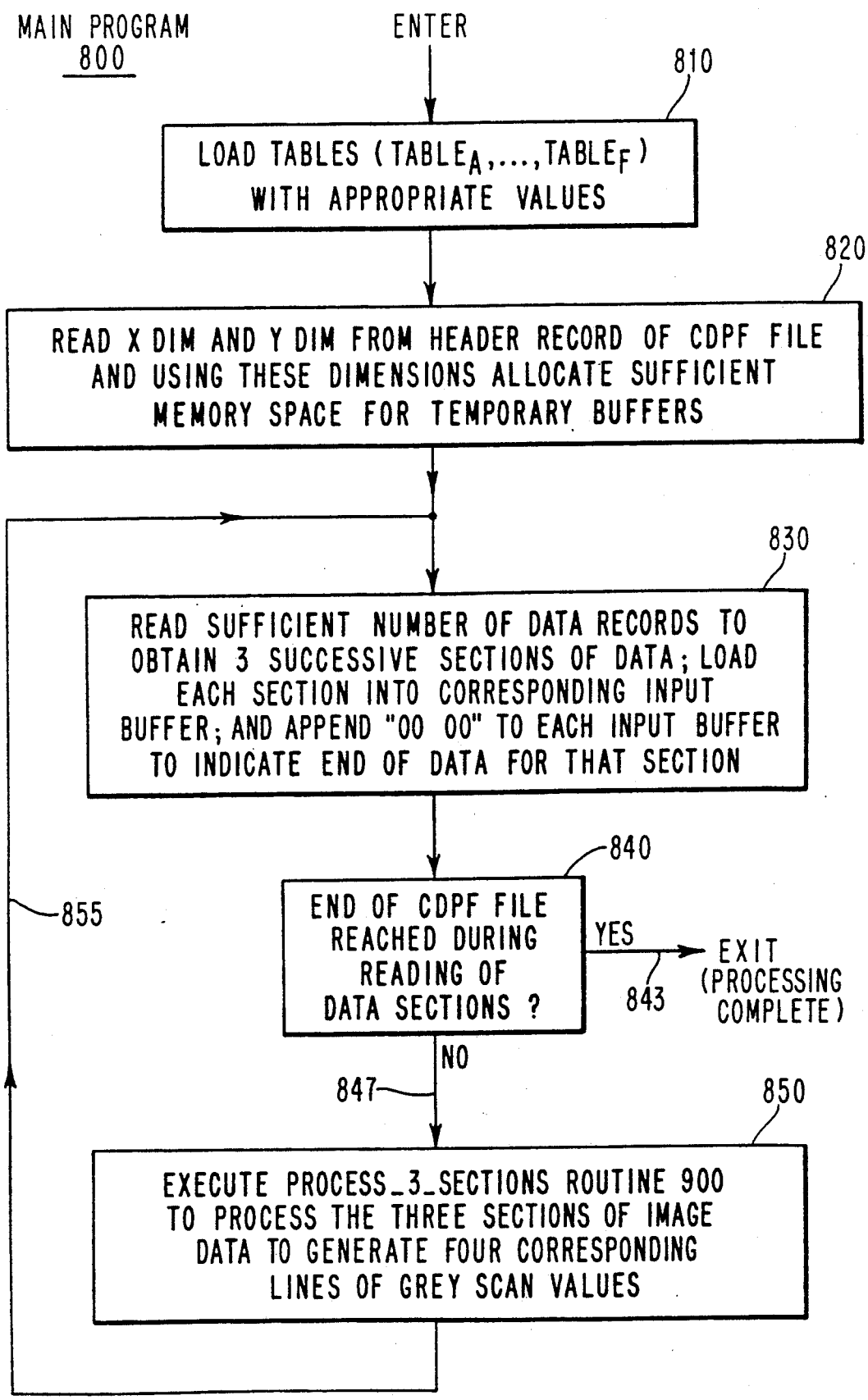

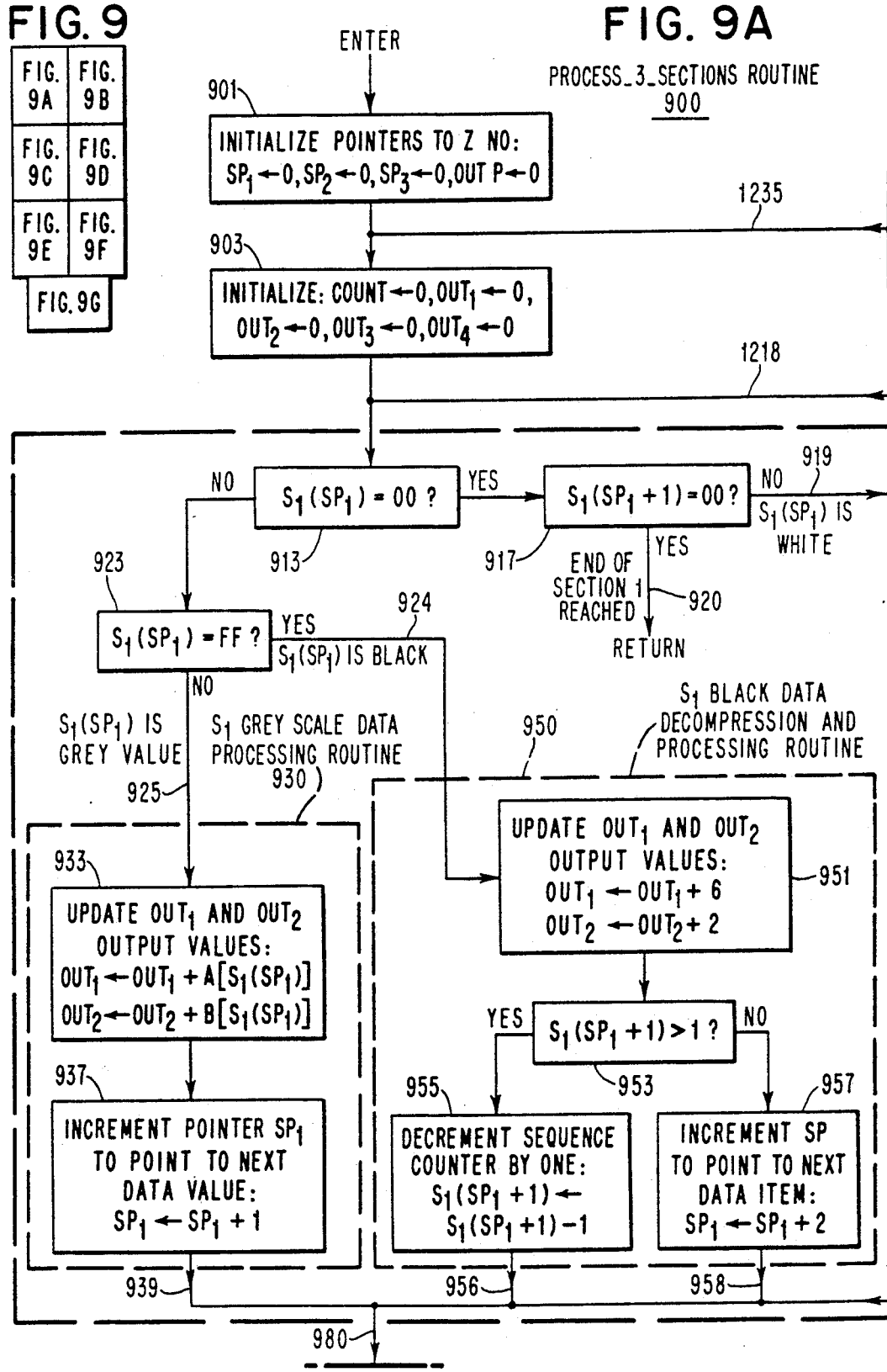

APPARATUS AND ACCOMPANYING METHOD FOR CONVERTING A BIT MAPPED MONOCHROMATIC IMAGE TO A GREY SCALE IMAGE USING TABLE LOOK UP OPERATIONS

BACKGROUND OF THE INVENTION

1. Field of the Invention

The invention relates to apparatus and a method for use therein for converting a relatively high resolution halftone bit-mapped monochromatic document, such as illustratively a halftone separation and which exists in a CDPF print file, into a relatively low resolution continuous tone grey scale document which, when the latter is applied to a display screen of a video monitor having grey scale capability, would provide a readable displayed page, i.e. a "preview", that approximately depicts how the halftone separation would appear when printed.

2. Description of the Prior Art

Although electronic communication is becoming rather ubiquitous, currently the printed page is still the predominant form of communication. A printed page contains text, graphics and/or images.

In the graphics arts industry, a page that will be mass reproduced is commonly referred to as an artwork. Traditionally, artworks were produced using manual document creation and page composition processes. Unfortunately, such manual processes proved to be tedious and costly. As such, electronic systems that create images, graphics and text and provide electronic page composition capabilities are seeing increasing use. With these electronic systems, an artwork, owing to its inclusion of graphics and/or images, is often stored in bit-mapped form for reproduction on a raster based output device. For black and white artworks, each location in the bit-map contains a binary value that specifies whether the pel (single bit value) situated at that location in the artwork is either white or black. For grey scale or color artworks, each location in the bit-map contains a multi-bit pixel value that respectively corresponds to the particular color or monochromatic shade that exists at that location in the artwork. Now, even though an artwork can be processed and stored electronically, a paper reproduction of that artwork into a printed page will ultimately need to be made, particularly if that page will form part of a publication, such as a magazine.

Currently, printing presses of one form or another are generally used to provide accurate mass reproductions of a color artwork. To avoid the need to use a differently colored ink in the press to print each different color in the artwork, current printing techniques rely on the fact that any color can be obtained as a linear combination of four primary subtractive colors: cyan, yellow, magenta and black. As such, to print a multi-colored artwork, four printed monochromatic images, each made from a corresponding primary colored ink, are successively made in separate printing passes on a common sheet of printing stock and overlaid on that sheet with proper registration to yield a single multi-colored page that, when viewed by an observer, accurately replicates the tonal colorations of a given artwork.

In particular, a colored artwork that is to be printed is first separated, typically by optical filtering and photographic processes, into four primary color continuous tone ("contone") separations. Each separation is essentially a monochromatic two-dimensional depiction on a transparent medium of the color information for only one of the primary colors in the artwork. As such, a different separation exists for cyan, yellow, magenta or black. However, only one separation (typically black) would be used for single color grey-scale artworks. Unfortunately, printing presses are not able to apply a differential amount of a colored ink to any one location in a page. As such, a printing press can not directly print a contone separation. To surmount this obstacle, the art teaches the use of halftone separations. A halftone separation is formed through screening a contone separation. With no tonal variations, each halftone separation contains a regularly spaced two-dimensional pattern of relatively small monochromatic dots with a resolution in most graphic arts applications of at least 85 dots/inch (approximately 34 dots/centimeter). Such a regular dot pattern has a relatively high spatial frequency. As a result of screening a contone separation that has tonal variations, the tonal variations in each location in the separation of the artwork change the spacing between adjacent dots located in corresponding locations in a halftone separation thereby spatially modulating the underlying regular halftone dot pattern for that color. Hence, when the halftone separation is viewed by a human eye, the modulated pattern is integrated by the eye to yield the corresponding tonal variations. Once the four halftone separations are made, these separations are transferred to separate printing plates which, in turn, are subsequently used to print four halftone separation patterns on common sheets of printing stock with proper registration. When the resulting printed sheet is then viewed by an observer, an accurate depiction of the desired colored artwork results from the spatial interaction of the four overlaid primary colored halftone separation patterns.

Unfortunately, when the individual halftone separation patterns are overlaid, the dots in each of these patterns interact to frequently form objectionable low frequency beat or interference patterns that appear as a repeating rosette pattern in some region of the printed page. This beat pattern is commonly referred to as a Moire pattern (hereinafter referred to as Moire). If the frequency of the beat pattern is sufficiently low in this region, then the associated Moire is very visible, quite unsightly and highly objectionable to an observer.

With this in mind, those skilled in the art readily realize that, to reduce Moire, each separation needs to be screened at a different angle with respect to a common axis. In this regard, different preset screen angles are often used to generate corresponding halftone separations of an artwork, with the angles commonly being 45, 75, 90 and 105 degrees for black, magenta, yellow and cyan, respectively. Occasionally, these screen angles may need to be appropriately varied to a different value to shift the beat frequency to a higher value where the resulting Moire is less visible to an observer.

Unfortunately, the amount of Moire that actually exists in any printed color page is often not known until the halftone separation patterns for that page are actually overlaid to yield a so-called "proof". Sometimes, the Moire is not detectable until later in the printing process when printing plates are made of the halftone separation patterns and an actual test sheet, i.e. a so-called "press sheet", is actually printed from these plates. Moreover, the existence of various other undesirable artifacts in a halftone separation, such as spots, streaks or the like, and/or excessive dot gain affects that may need to be corrected are also frequently not known until the press sheet is actually made.

As a result of these undesirable affects, an iterative trial and error process is often undertaken by a color technician to generate a proof followed by a press sheet such that each of these affects, if they exist, can be seen and appropriate adjustments made in the printing process, e.g. rotating the screen and/or changing the separations to eliminate an artifact and/or changing the dot size, to ultimately generate an acceptable press sheet that accurately reproduces the colorations in a given artwork. However, due to the inherent variability in producing an acceptable set of halftone separations, this process can be tedious, inordinately time consuming and hence expensive.

In an effort to reduce the time required and expense associated with manual color reproduction processes, the art has turned away from use of these manual processes in high volume graphic art applications to the use of electronic page creation and composition systems, as noted above. These systems convert contone separations into electronic (often digital) form, electronically change screen angles and compensate dot size for expected dot gain, and electronically produce appropriate halftone separations thereby eliminating the need to photographically generate the separation transparencies and the proof. Such systems aim to produce accurate halftoned color separations at an increased throughput and at a lower cost than that heretofore possible with traditional manual color reproduction processes.

One component of an electronic image creation and composition system is a high resolution bit-mapped printer that is capable of directly printing a halftone separation. Such a printer which is particularly advantageous to print halftone separations is the IBM Model 4250 electro-erosion printer (IBM is a registered trademark of the International Business Machines Corporation in Armonk, N.Y.). This printer utilizes a special printing media formed of a thin aluminum sheet overlaying either a dark contrast layer or a transparent undercoat. During printing, the printer produces each darkened pel in a printed page on this printing media by selectively vaporizing (electro-eroding) the aluminum film which is situated at that pel location on the print media. If printing media with a dark contrast layer is used, then this media, when eroded, could serve as a camera ready master for a halftone separation. Alternatively, if printing media with a transparent undercoat is used, then this media, when eroded, could serve as either a camera ready negative or short run printing plate. Through this printing process, this printer is able to provide an all points addressable resolution of 600 dots (pels) per inch (approximately 236 dots/centimeter) which provides a printed halftone separation that is able to clearly depict rather fine detail. Such a printing density is approximately 4-6 times the current density of 60,000 to 90,000 dots/square inch (approximately 9,300 to 13,950 dots/square centimeter) that is attainable with present xerographic and laser printing techniques and thus is capable of depicting finer detail than that possible with these techniques.

Because of the enormous number of separate pels (5100-by-6600 or 33.66 million) that could comprise an electro-erosion print file for illustratively an 8½ by 11 inch (approximately 22-by-28 centimeter) page, the printer would require a significant amount of time to produce a printed page, particularly if that image contains mostly dark areas. Inasmuch as generating an acceptable set of halftone separations often requires generating a set of separations, detecting abnormalities therein and varying separation parameters and then iteratively repeating this process until acceptable separations are produced, significant time would be expended if every separation that was generated during this iterative process was printed with the electro-erosion printer.

As such, to markedly decrease the turnaround time needed to form an acceptable set of halftone separations using an electro-erosion printer as part of an electronic page creation and composition system, it would be particularly advantageous to display a readable pattern, i.e. a "preview", on a video monitor that approximately depicts how a halftone separation pattern would appear when printed in lieu of actually printing that separation—provided that the time required to generate such a display would be significantly faster than the time required by the printer to actually print the separation. Through use of such a "preview" image, a color technician could, on an interactive basis, display a "preview" of a halftone separation pattern, determine if abnormalities exist in the "preview", make appropriate corrections to the separation parameters, e.g. vary screen angle or the like and/or dot size, electronically generate a new separation and obtain a "preview" of its halftone pattern to verify the accuracy of the new separation all in a relatively short interval of time. By employing such a "preview", the electro-erosion printer would only be used to generate a halftone separation after the "preview" indicates that the halftone pattern produced thereby is likely to be satisfactory. This, in turn, would likely and advantageously eliminate a significant number of printing operations as well as a significant portion of the tedium, time and expense associated with generating an acceptable set of color separations by electronic page creation and composition systems known in the art.

Unfortunately, generating a suitable "preview" for display on a video monitor has proven to be difficult. In particular, the resolution inherent in a bit-map produced for an electro-erosion printer (33.66 million single bit pels) is substantially larger than that provided by even a high resolution video display. Illustratively, a suitable high resolution display that possesses the capability of displaying a single color with at least 37 different shades is the IBM model PS/2 8514 video display. Such a display provides a resolution of 1024 horizontal pixels by 768 lines for a total display of 804,864 separate multi-bit (eight bit) pixels, with each pixel taking on any one of 64 different shades of a selected color. Unfortunately, while a video monitor produces separate dots, the spacing between adjacent dots (the so-called "writing pitch") is fixed, as contrasted with the variable spacing inherent in a halftone separation. The monitor only possesses the capability to display a fixed size dot or not and change the intensity of that dot, i.e. its shading.

Hence, not only must the speed of producing the "preview" be sufficiently fast and the resolution of the bit-mapped halftone separation pattern be converted to a resolution suitable for display on a video monitor, but also the spacing variations inherent in a halftone separation pattern must be properly converted to shading variations and the resulting displayed page must be sufficiently readable such that it is able to depict, to an observer, various abnormalities that could occur in the halftone separation pattern.

With these requirements in mind, none of the methods, commonly referred to as "anti-aliasing", known in the art for producing a continuous tone displayed image at a relatively low resolution from a much higher resolution bit-mapped halftoned separation pattern has proven to be satisfactory for use in generating such a "preview" image. For example, U.S. Pat. No. 4,630,125 (issued to P. Roetling on Dec. 16, 1986) discloses a method for unscreening a stored digital halftone image. Inasmuch as this method relies on processing both each pel in the screened image and also a neighborhood of surrounding pels, this method requires an inordinate amount of execution time. Moreover, this method does not address how the resolution of the bit-mapped halftone separation pattern would be converted to an image at a lower resolution suitable for display on a video monitor. U.S. Pat. No. 4,533,942 (issued to W. Gall et al on Aug. 6, 1985) addresses a method for reproducing a contone image with a coarser resolution for display on a video monitor than that at which the image was scanned. Unfortunately, this patent, which relies on forming a weighted sum of a field of fine resolution pixel values to form a corresponding single low resolution pixel value for display, does not address how a bit-map of single bit pel values would be converted to corresponding multi-bit grey scale pixel values.

Therefore, a need exists in the art for apparatus and particularly for a method implemented therein that is sufficiently fast for generating a "preview" image, at a relatively low resolution suitable for display on a video monitor and with appropriate shading variations, that approximately depicts how a higher resolution bit-mapped monochromatic pattern would appear when printed. By incorporating such a method into an electronic page creation and composition system, the time needed to generate an acceptable set of halftone color separations can be significantly reduced. This, in turn, can advantageously result in a concomitant increase in the throughput of high quality halftone separations than that which can be provided by such electronic systems known in the art. Moreover, use of such a method would advantageously allow an electro-erosion printer to be used in such a system for use in directly printing halftone separations that can depict finer detail than that heretofore possible with other printing techniques and without adversely affecting, to any appreciable extent—if at all, the turnaround time of the system.

SUMMARY OF THE INVENTION

Accordingly, an object of the present invention is to provide apparatus and a method for use therein for generating a "preview" of a high resolution bit-mapped monochromatic pattern, such as illustratively a halftone dot pattern, at an appropriately decreased resolution suitable for display on a video monitor.

A specific object is to provide such a method that converts the spacing variations inherent in a bit-mapped monochromatic halftone dot pattern into appropriate shading variations for display on the monitor.

Another specific object is to provide such a method that requires substantially less time to execute for an entire bit-mapped pattern, particularly that associated with an electro-erosion printer, than that required by the printer to actually print the pattern.

Another specific object is to provide a "preview" that is sufficiently readable to a human observer such that it can approximately depict how the bit-mapped pattern would appear when printed and show various abnormalities that could occur in the pattern.

These and other objects are accomplished in accordance with the teachings of the present invention by first forming successive groups of a pre-defined number of vertically contiguous blocks of pels from a bit-mapped pattern, such that the groups are arranged horizontally across the pattern and form one of a plurality of contiguous horizontal strips of the bit-mapped pattern, wherein each block has a pre-determined number of pels that exist within the bit-mapped pattern. Thereafter, a corresponding multi-bit grey scale value is determined for each block in the strip wherein the grey scale value represents the number of pels that have a common binary value, typically "1". The grey scale values occur on a 1:1 correspondence with the blocks in the strip and are stored in an output buffer in the same order as that in which the blocks occur. As a result, a number of individual horizontal lines of successive grey-scale values in the "preview" image are generated wherein the number of lines correspond in number to and preferably are generally equal to the number of blocks in each group. In particular, each grey scale value for any one block is generated by: successively applying each pre-defined cluster of vertically adjacent pels that is situated within each column of vertically contiguous pels situated within that block as input to a corresponding pre-defined look-up table to determine an output count for the column, wherein the output count represents the number of pels in the column that have the common binary value, typically "1", and then accumulating the output count for every successive column in that block in order to provide the grey scale value corresponding to that block. The forming and determining steps are then repeated for every remaining horizontal strip occurring in the bit-mapped pattern in order to vertically sequence through the pattern and generate corresponding lines of grey scale output values for each of these strips in order to generate a complete "preview" image.

In accordance with a specific embodiment of the invention, illustratively three sections of eight-bit high scan data that form a strip in the bit-mapped pattern, typically a bit-mapped halftoned separation pattern, are read in at a time from a CDPF encoded print file. Each section is stored in separate corresponding input buffer. Each set of three vertically contiguous scans, i.e. twenty four bits, is then, for a 45 degree screen angle, divided into preferably six pel clusters which are effectively re-combined to form four 6-by-6 blocks of pels. A count of the number of pels in each cluster that are darkened, i.e. "1", is obtained by routing the entire eight-bit scan containing that cluster through a "256" value look-up table. Depending upon which cluster(s) form a column in each block, the results provided by various ones of six individual corresponding look-up table(s) are selectively summed together, if appropriate, to form four output values, one for each block. The output value for each block is summed over the six columns that occur in that block in order to generate a corresponding grey scale value for that block. Four grey scale values are generated at a time with four lines of grey scale values being generated for each strip. Once a strip is fully processed to yield four such lines of grey scale values, the next successive strip in the bit-mapped pattern is processed in the same manner in order to yield the next four lines of grey scale values and so on until a complete "preview" image has been generated from the bit-mapped separation pattern.

In accordance with a feature of the invention, grey scale "preview" images of different separations of a common artwork could be overlaid and displayed on a monitor screen to form a composite image. In this case, each "preview" image would be assigned a different base color with grey scale values being encoded in tonal variations of that color. Although the coloration of the composite image would not likely match that of the artwork, as printed, (inasmuch as a color display relies on using linear combinations of additive primary colors — red, green and blue while color printing processes rely on forming linear combinations of subtractive primary color cyan, yellow, magenta and black), the variations in the coloration of the composite image could disclose various Moire patterns and certain undesirable affects that would result from the spatial interaction of two or more halftoned separation patterns. Although such a composite image will likely not disclose, due to the limited resolution of the display, all Moire patterns and other adverse affects that could arise in the printed reproduction of the artwork due to the interaction of its halftoned separation patterns and also will not disclose dot gain affects, any Moire or other undesirable affects present in the composite "preview" image would in all likelihood exist in the printed reproduction. As such, initial attempts could be made to expeditiously correct these affects that are disclosed in a composite "preview" image.

BRIEF DESCRIPTION OF THE DRAWINGS

The teachings of the present invention may be readily understood by considering the following detailed description in conjunction with the accompanying drawings, in which:

FIG. 8 depicts a flow chart of Main Program 800 that, when executed in processor 20 shown in FIG. 1, implements my inventive method;

FIG. 9 shows the correct alignment of the drawing sheets for FIGS. 9A-9G; and

FIGS. 9A-9G collectively depict a flowchart of Process_3_Sections Routine 900 that is executed as part of Main Program 800 shown in FIG. 8.

To facilitate reader understanding, identical reference numerals have been used, where possible, to denote identical elements that are common to the figures.

DETAILED DESCRIPTION

After reading the following description, those skilled in the art will quickly realize that the inventive method will find application to a wide variety of different situations to provide the capability of generating a visual "preview" image of a relatively high resolution bit-mapped print file on a lower resolution display screen. For purposes of illustration, the inventive method is disclosed in the context of converting a CDPF bit-mapped halftone print file that is produced for the IBM 4250 electro-erosion printer with a resolution of 600 dots/inch (approximately 236 dots/centimeter) into a file suitable for display on a video monitor, such as the IBM model 8514 display, that has 64 levels of grey and a resolution of 1024 horizontal pixels by 768 lines. Clearly, the inventive method can readily provide a preview capability, for use within an electronic page creation and composition facility that generates a set of acceptable color separations, in order to provide a readable on-screen displayed monochrome version of each halftone separation which approximates how a printed version of that separation pattern would appear. Alternatively, this inventive method could be integrated into a computer program, such as illustratively a spreadsheet or word processor that generates a bit-mapped print file, to provide an on-screen display of a formatted page as that page will appear when subsequently printed, such as by a dot matrix, laser printer or the like. This preview capability is commonly referred to as "What You See Is What You Get" (WYSIWYG).

Figure 1:
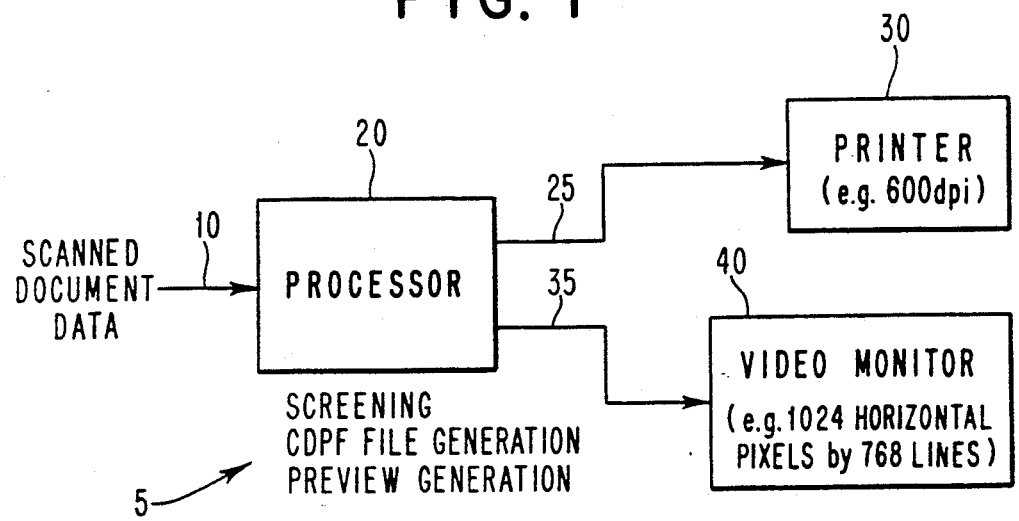
FIG. 1 depicts a block diagram of a system that implements my inventive method.

FIG. 1 depicts a block diagram of system 5 that implements my inventive method. This system is formed of processor 20, printer 30 which is illustratively an IBM model 4250 electro-erosion printer having a resolution of 600 dots/inch, and video monitor 40 which is illustratively an IBM model 8514 display that can depict 64 levels of grey at a resolution of 1024 horizontal pixels by 768 lines. With this system, scanned document data for any given separation is applied in continuous tone form by a well known scanner, such as illustratively a charge coupled device (CCD) or other scanner not shown, to lead 10. This data is routed to processor 20 which can take the form of any of a variety of well known digital, e.g. microprocessor based, processors. Under software control, this processor screens the continuous tone scanned data to form a screened halftoned separation pattern, generates a relatively high resolution bit-mapped halftone print file in preferably CDPF (Composed Document Printing Facility) form for use by printer 30 and also, upon request by a system operator, not shown, converts the CDPF print file for that halftoned separation pattern into grey scale data at a low resolution suitable for display as a "preview" image on video monitor 40. Though any one of a wide variety of screening processes can be successfully used, the inventive method is particularly suited to utilize the PREPRESS screening process disclosed in G. Goertzel et al, "Digital Halftoning on the IBM 4250 Printer", *IBM Journal of Research and Development*, Vol. 31, No. 1, January 1987, pages 2-15 (hereinafter referred to as the Goertzel et al publication). The "preview" image approximates how a printed version of that separation pattern would appear as printed by printer 30. To print a separation, processor 20 applies the appropriate CDPF print file along with appropriate control commands to leads 25. To display the "preview" image of a separation, the associated grey scale image data is applied by the processor, via leads 35, to monitor 40. To simplify the following discussion, the term "pel" will hereinafter refer to any single bit halftoned value that forms part of a bit-mapped separation pattern stored within a CDPF print file (in this regard, see the Appendix in pages 13 and 14 of the Goertzel et al publication); while the term "pixel" will hereinafter refer to a multi-bit grey scale value for display on the monitor.

As discussed in detail below, my inventive method converts the relatively high resolution bit-mapped halftoned separation that occurs at 600 dots/inch into a low resolution image for display on monitor 40. This conversion necessitates matching the halftoned printing density provided by printer 30 of 360,000 dots/square inch (approximately 55,800 dots/square centimeter) which results in 33.66M dots for an 8½ by 11 inch (approximately 22-by-28 centimeter) document to a bit-mapped grey scale image with a resolution of 1024 horizontal pixels by 768 lines. In essence, my inventive method relies on determining a grey scale value that corresponds to the number of pels that are "on", i.e. black, and are situated within a corresponding region of the bit-mapped separation pattern. A separate grey scale value is produced for each different region in the bit-mapped separation pattern. This region is illustratively and preferably chosen to be a 6-by-6 block of bit-mapped halftoned pel values inasmuch as this size readily matches the size of two adjacent halftone cells produced by the PREPRESS screening process (each cell is 3-by-6 pels) and produces a displayed resolution of approximately 100 pixels/inch (approximately 39 pixels/centimeter) on monitor 40. Inasmuch as only between zero and 36 different pels situated within any 6-by-6 block can be "on", my method requires only 37 different shades of grey for this block size. Given this block size, I have observed that the resulting "preview" image nicely fits within the confines of the display screen of monitor 40 and does not exhibit appreciably any noticeable and objectionable Moire patterns. Clearly, as set forth below, my inventive method can be readily applied to any different block size, such as illustratively 8-by-8 and 4-by-4, or even rectangular or other shaped blocks. The block size and shape depend upon the halftone cell geometry produced by the screening process and the amount of compression needed to match the resolution of the screened halftoned separation pattern to that of the desired displayed image. Moreover, for a given display, the block size can be dynamically and locally changed, e.g. decreased, to provide a "zoom" capability in order to increase the displayed size of a selected portion of the "preview" image.

In order to fully understand my inventive method and the manner through which it converts a relatively high resolution bit-mapped halftone separation that exists in CDPF format to a relatively low resolution display image, the discussion will first briefly describe the CDPF format followed by a detailed discussion of my method.

Figure 2:
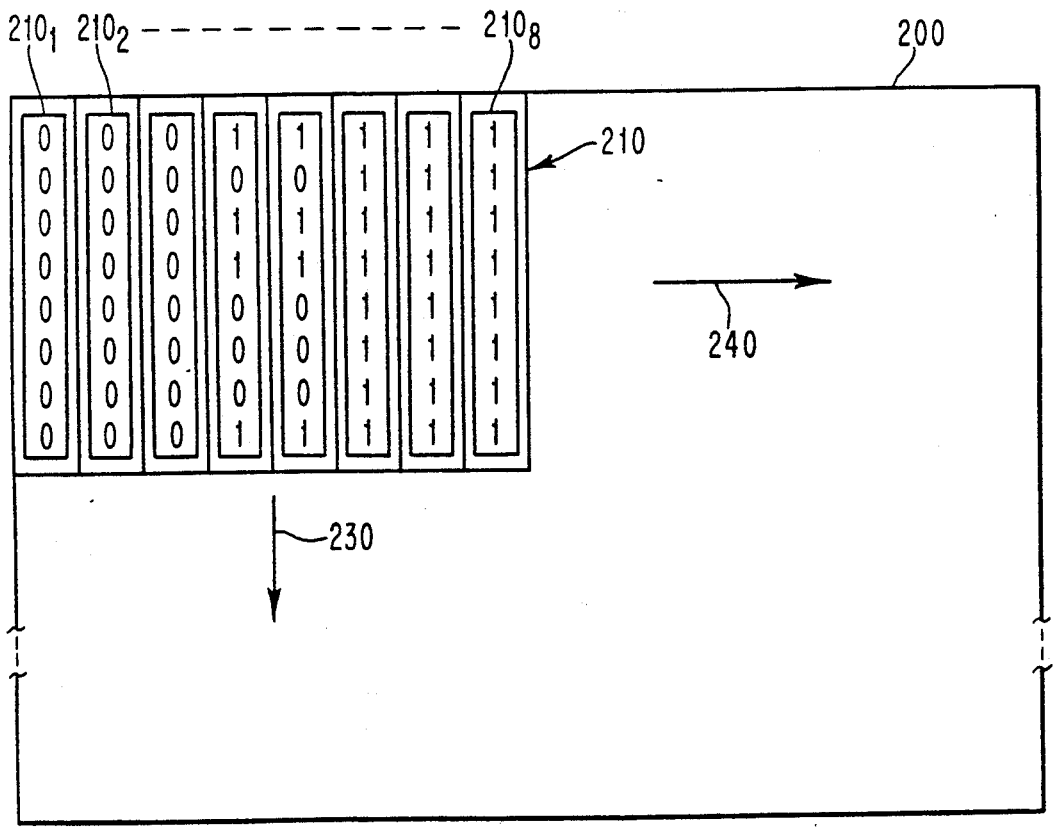
FIG. 2 depicts a bit-mapped document that is to be printed by printer 30 shown in FIG. 1.

FIG. 2 depicts bit-mapped halftoned separation pattern 200 that is to be printed by printer 30 shown in FIG. 1. The pattern is divided, starting in its upper left hand corner, into eight-pel high horizontal sections, each eight-pel high group hereinafter referred to as "scans". Each section runs horizontally across from the left to right edges of the separation in the direction shown by arrow 240 and contains pel data for the portion of separation 200 contained therein. Successive sections run vertically down the image in the direction shown by arrow 230. A vertically contiguous number of sections, here illustratively three sections, forms a horizontal strip across the image. A portion of one section, illustratively the first section, is shown as portion 210. Portion 210 contains scans $210_1, 210_2, \ldots, 210_8$. Given this arrangement of scans in the bit-mapped halftoned pattern, the CDPF file stores each section as a succession of bytes in which each byte has an eight bit-value equal to the bit-mapped pel data in its corresponding scan. In the absence of any compression, as discussed below, a one-to-one correspondence will exist between each scan in a section and its associated data byte.

Figure 3:
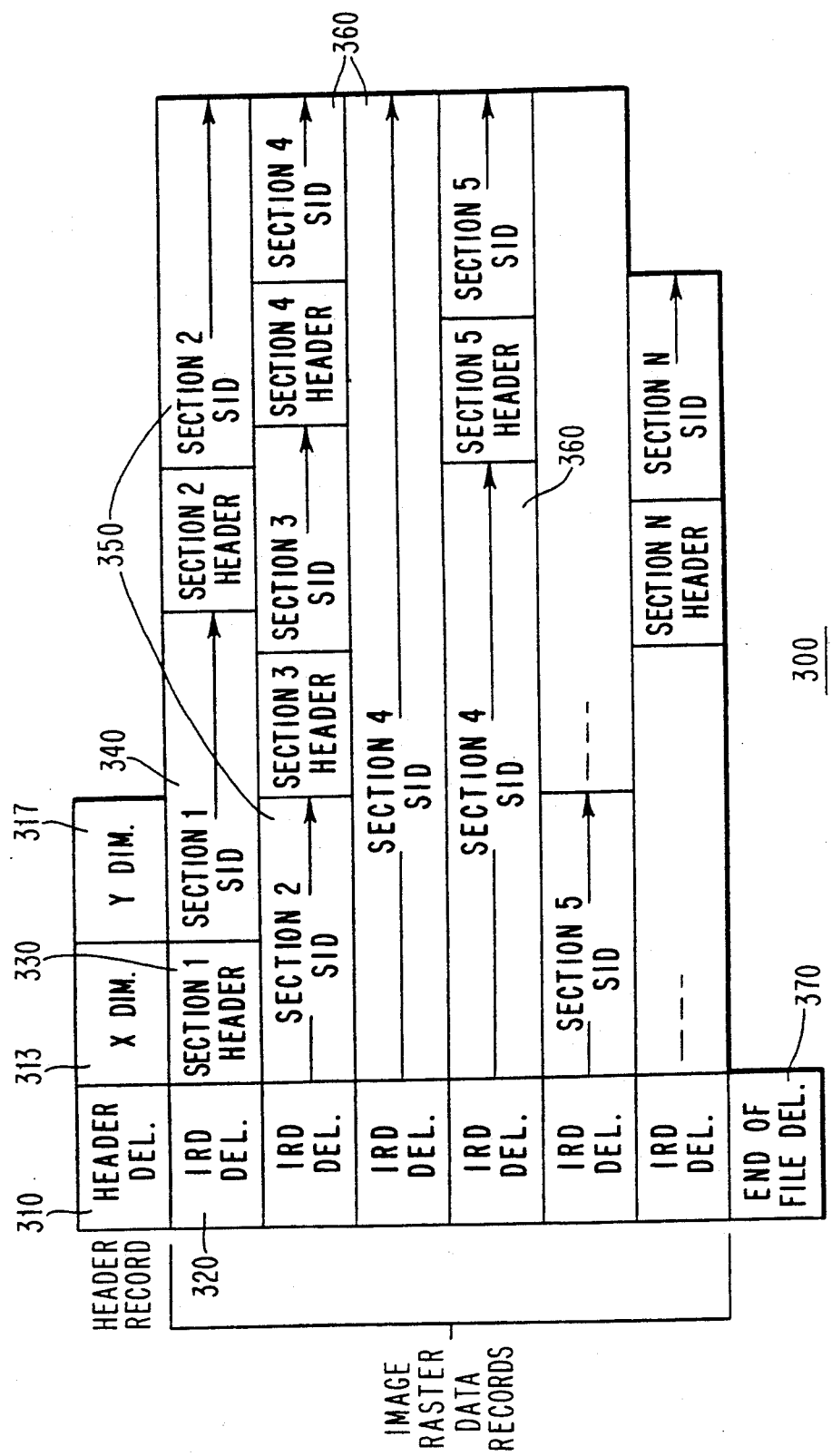
FIG. 3 depicts the overall file structure for a CDPF print file, illustratively file 300, used by printer 30 shown in FIG. 1.

With this in mind, FIG. 3 depicts the overall file structure for a CDPF print file, illustratively, file 300, used by printer 30 shown in FIG. 1. As shown in FIG. 3, the data for each section is recorded separately. The sections, starting from the top of the separation, e.g. section 1, section 2 and so on, successively follow one another in the CDPF file. To eliminate unnecessary data from a section, any solid white area that occurs immediately prior to the end of a section, i.e. areas in which the pels are "0" (off), are not encoded. Each section is stored using two fields: a section header and section image data (SID). Section data (section headers and accompanying section image data—SID) are stored within a corresponding image raster data (IRD) field that forms part of an IRD record within the CDPF file. Within any IRD record, the IRD field is preceded by an IRD delimiter field, such as IRD delimiter field 320. Inasmuch as an IRD field is limited in length to 2K bytes, section image data can be split among successive IRD fields, such as the case with sections 350 and 360. Section headers, in contrast, can not be split across successive IRD field boundaries. A section header, e.g. header 330, contains various fields, as explained in detail with FIG. 4, that specify various attributes of the associated section image data. End of file delimiter 370 sequentially follows the end of the last section in order to mark the end of the CDPF file. File header delimiter 310 situated at the beginning of the file signifies the start of the file. This delimiter is followed by fields X DIM and Y DIM which specify the x and y dimensions of the encoded image for use by the printer. These dimensions will also be subsequently used by processor 20 (see FIG. 1) to allocate sufficient memory space for converting the entire halftone bit-mapped separation pattern stored within file 300 into appropriate grey scale values.

Figure 4:
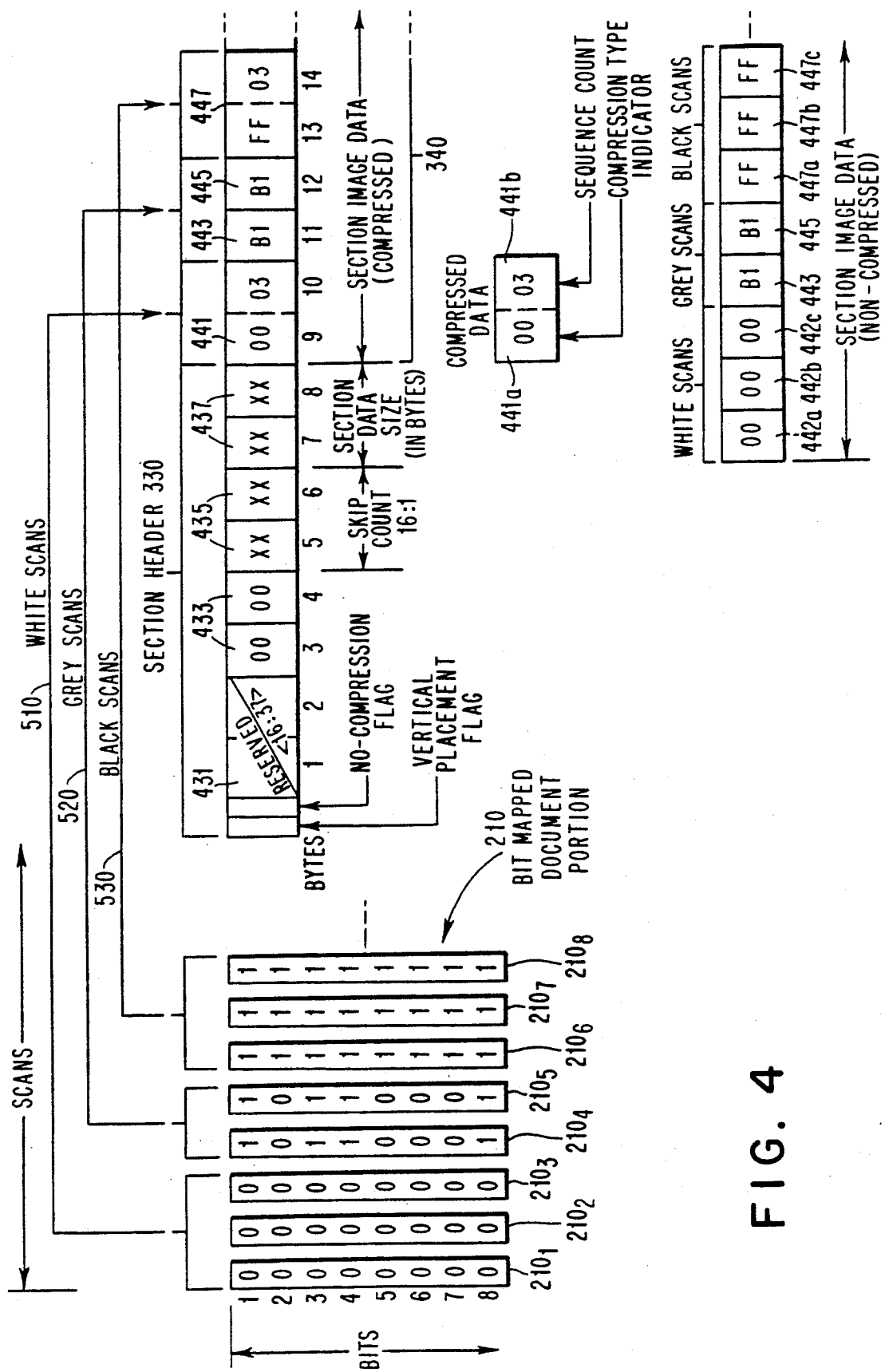
FIG. 4 depicts the structure of each section of data that forms part of CDPF file 300 shown in FIG. 3, and specifically the constituent fields of a particular section that stores bit-mapped data which includes illustratively document portion 210 shown in FIG. 2.

Given this overall file structure, FIG. 4 depicts the structure of each section of data that forms part of CDPF file 300 shown in FIG. 3, and specifically the constituent fields of a particular section, i.e. section 1, that stores bit-mapped data which includes illustratively bit-mapped document portion 210 shown in FIG. 2. As shown in FIG. 4, section 1 includes section header 330 and section image data 340. The section header contains eight bytes. Bytes 1 and 2 collectively form one field of sixteen bits, i.e. field 431, in which the first two bits, i.e. bits <1> and <2> respectively store the vertical placement flag and the no compression flag with the remaining bits, i.e. bits <16:3>, being unused (reserved) and thus ignored by the printer. The vertical placement flag specifies where the section is to be placed within a composing window with respect to a vertical direction. Specifically, if this flag is zero, then the section will be placed at the nearest pre-determined eight-pel boundary of the window. In this case, the largest possible pel vertical error will be four pels (up or down) which at a resolution of 600 dots/inch corresponds to 0.00666 inch (0.0169 centimeters). In contrast, if this flag is one, then one section immediately follows the next, regardless of whether that section begins at a pre-determined eight-pel boundary or not. To ensure uniform section placement throughout the printed separation pattern, this flag should be set to one for every section in the entire separation. The no-compression flag specifies whether section image data is stored in a compressed form. Each scan can contain one of three data types: all white pels (eight "0" values), all black pels (eight "1" values), or a grey value (an eight-bit mixture of "0" and "1" values). If the no-compression flag is one, then the data byte for each scan is stored one after another in the corresponding SID field with a one-to-one correspondence between each scan in that section and a byte stored therein with the exception that trailing white scans are not encoded. A section always terminates with either a black or grey value. Alternatively, if the no-compression flag is zero, then any contiguous series of white or black scans, is compressed into two eight-bit fields, as typified by fields $441_a$ and $441_b$, and stored within a successive sixteen bit compression sequence field, e.g. field 441, in the SID field. Specifically, within the compression sequence field, the first byte, i.e. a compression type indicator typified by field $441_a$, stores an eight bit compression type indicator which, in hex notation, is either "00" for a series of white pels or "FF" for a series of black pels. The second byte, i.e. a sequence counter typified by field $441_b$, stores an eight bit value that specifies the number of times, up to the value "255", that either a black or white scan successively occurs. For sequences longer than "255" identical scans, successive compression sequence fields are used. To compress the white data stored in scans $210_1$, $210_2$ and $210_3$, the compression type is set to "00" and the sequence counter is set to the value "03" as indicated in fields $441_a$ and $441_b$, with the correspondence between these scans and field 441 being symbolized by line 510. Fields $441_a$ and $441_b$ are stored as compression sequence 441 within SID 340. Likewise, to compress the black data stored in scans $210_6$, $210_7$ and $210_8$, the compression type is set to "FF" and the sequence counter is set to the value "03" within compression sequence 447 within SID 340, with the correspondence between these scans and field 447 being symbolized by line 530. Grey scale values, typified by those existing within scans $210_4$ and $210_5$, are simply stored as single bytes, such as bytes 443 and 445, within the SID field, with the correspondence between these scans and fields 443 and 445 being symbolized by line 520. By contrast, non-compressed image data for scans $210_1$, $210_2$, $210_3$, $210_4$, $210_5$, $210_6$, $210_7$ and $210_8$ are shown encoded in fields $442_a$, $442_b$, $442_c$, 443, 445, $447_a$, $447_b$ and $447_c$. Although uncompressed white and black scan data is allowed in the CDPF format, any resulting data structure that relies on this encoding scheme is quite inefficient and, for that reason, should be avoided. As such, the following discussion will assume that all white and black scan data will only appear in compressed form. To simplify the following discussion, a "data record" will refer to the data structure used to hold each successive item of bit-mapped halftoned pel data in any section, i.e. a grey scale data byte or a compression sequence field.

Bytes 3 and 4 within any section header, which collectively form field 433 in header 330, are reserved for other uses and as such are set to "0000" and ignored by the printer. Bytes 5 and 6, which collectively form field 435 in header 330, store a sixteen bit count, i.e. the skip count, that specifies the number of empty sections that successively and geometrically follow the present section in the file. To reduce file size, empty sections are simply not recorded in the file. If the skip count is set to "0000" then the next recorded section in the CDPF file is geometrically contiguous in the separation to the preceding section in the file. Bytes 7 and 8, which collectively form field 437, store a sixteen bit count, i.e. the section data size count, that specifies, in bytes, the size of the following SID data. This count may vary from section to section due to compression of successive scans and the presence of non-recorded trailing white space at the end of a section. If the section data size is zero, then no section image data exists in this section. These sections are only permitted as the first section in a CDPF file to record white space at the top of the printed separation. All other occurrences of empty sections are encoded by use of the skip count field.

Figure 5:
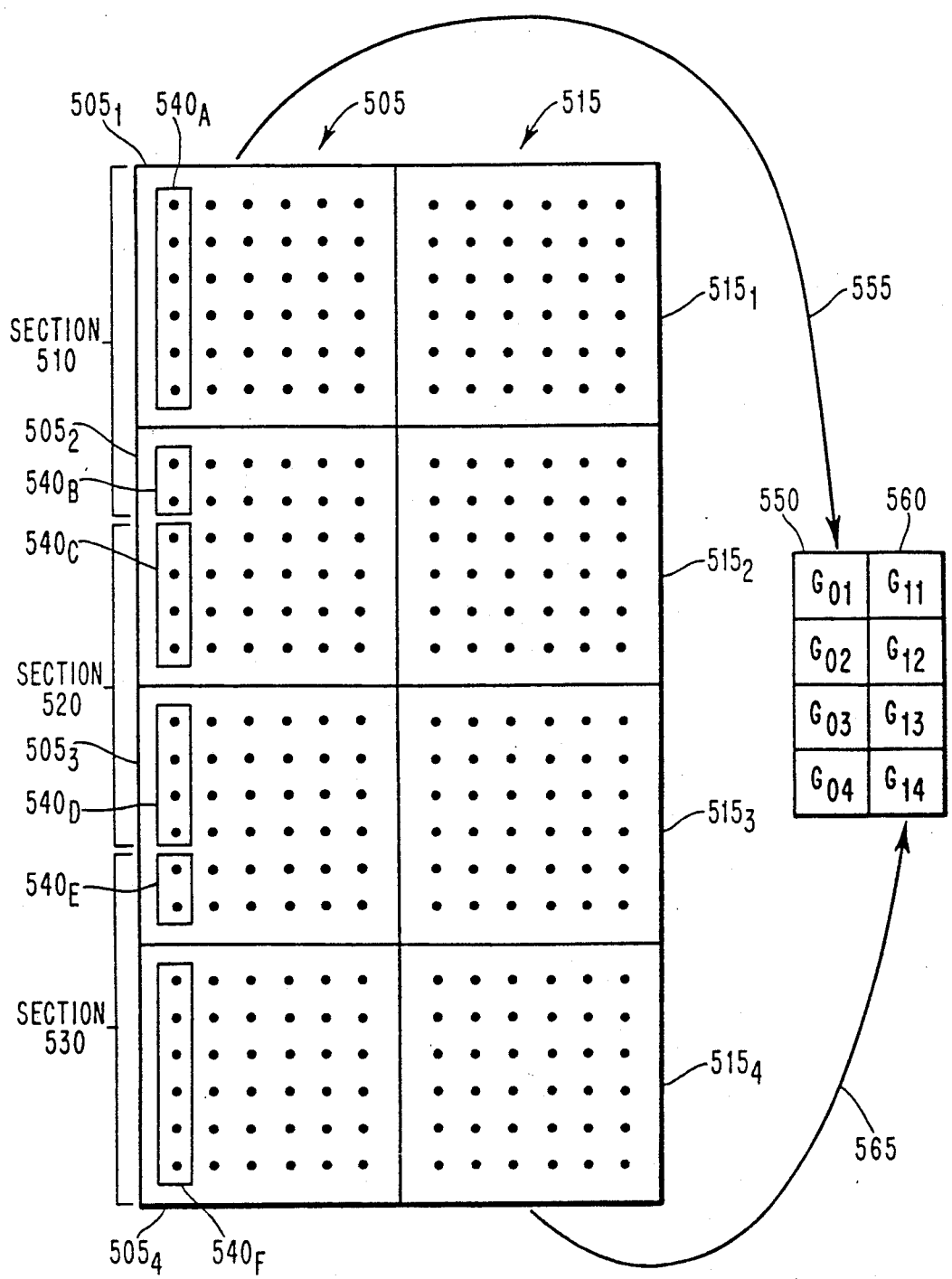
FIG. 5 depicts the pels that form a portion of the bit-mapped document shown in FIG. 2 and the corresponding grey scale values generated by my inventive method for display on a video monitor.

FIG. 5 shows the correspondence between the pels that form successive scans and the corresponding grey scale values generated by my inventive method for display on a video monitor. As shown and discussed above, four vertically contiguous multi-bit grey scale values are generated by processing a group of four corresponding vertically contiguous 6-by-6 blocks of scan data. For example, grey scale values, $G_{01}$, $G_{02}$, $G_{03}$ and $G_{04}$ in column 550 and $G_{11}$, $G_{12}$, $G_{13}$ and $G_{14}$ in column 560 result from processing pel scan data in four vertically contiguous 6-by-6 blocks of pels that respectively form groups 505 and 515 as symbolized by corresponding lines 555 and 565.

As noted above, a CDPF file stores sections of eight-pel high scan data but not six-pel high scan data. As such, to fabricate four 6-by-6 pel blocks from eight-bit scan data, three sections, e.g. sections 510, 520 and 530, of scan data are used. These sections provide twenty four vertically aligned bits of pels which are themselves then divided into various clusters. The clusters are combined to yield four successive columns of six vertically aligned and contiguously situated pels. The total number of pels that are "on", i.e. black, within a 6-by-6 block, e.g. block $505_1$, are accumulated with the result (that takes on a value between 0 through 36) for each block forming a corresponding grey scale value, e.g. value $G_{01}$. Specifically, for a 45 degree screen angle, pel clusters $540_A$, $540_B$, $540_C$, $540_D$, $540_E$ and $540_F$ are assembled with six, two, four, four, two and six pel values, and are then combined to form four six-pel high columns that are separately situated within blocks $505_1$, $505_2$, $505_3$ and $505_4$. Cluster $540_A$ contains six pels and hence occupies one entire column of block $505_1$. Inasmuch as cluster $540_B$ contains the remaining two pels within the first scan in section 510, this cluster is aggregated with cluster $540_C$ which contains the first four pels in section 520 to collectively form one column of block $505_2$. Since cluster $540_D$ contains the remaining four pels within the first scan in section 520, this cluster is aggregated with cluster $540_E$ which contains the first two pels in section 530 to collectively form one column of block $505_3$. Lastly, cluster $540_F$ which contains the remaining six pels in section 530 forms one entire column of block $505_4$. The number of pels that form each cluster, the number of clusters that are used, and the manner in which the individual clusters are combined to form appropriate columns will be primarily dictated by the difference between the resolution of the bit-mapped halftone separation and that of displayed image and the screen angle of the separation.

Having now sufficiently described the CDPF print file and the correspondence between the pels that form successive scans in that file and the corresponding grey scale values generated by my inventive method, the discussion will now turn to a detailed discussion of my method.

Figure 6:
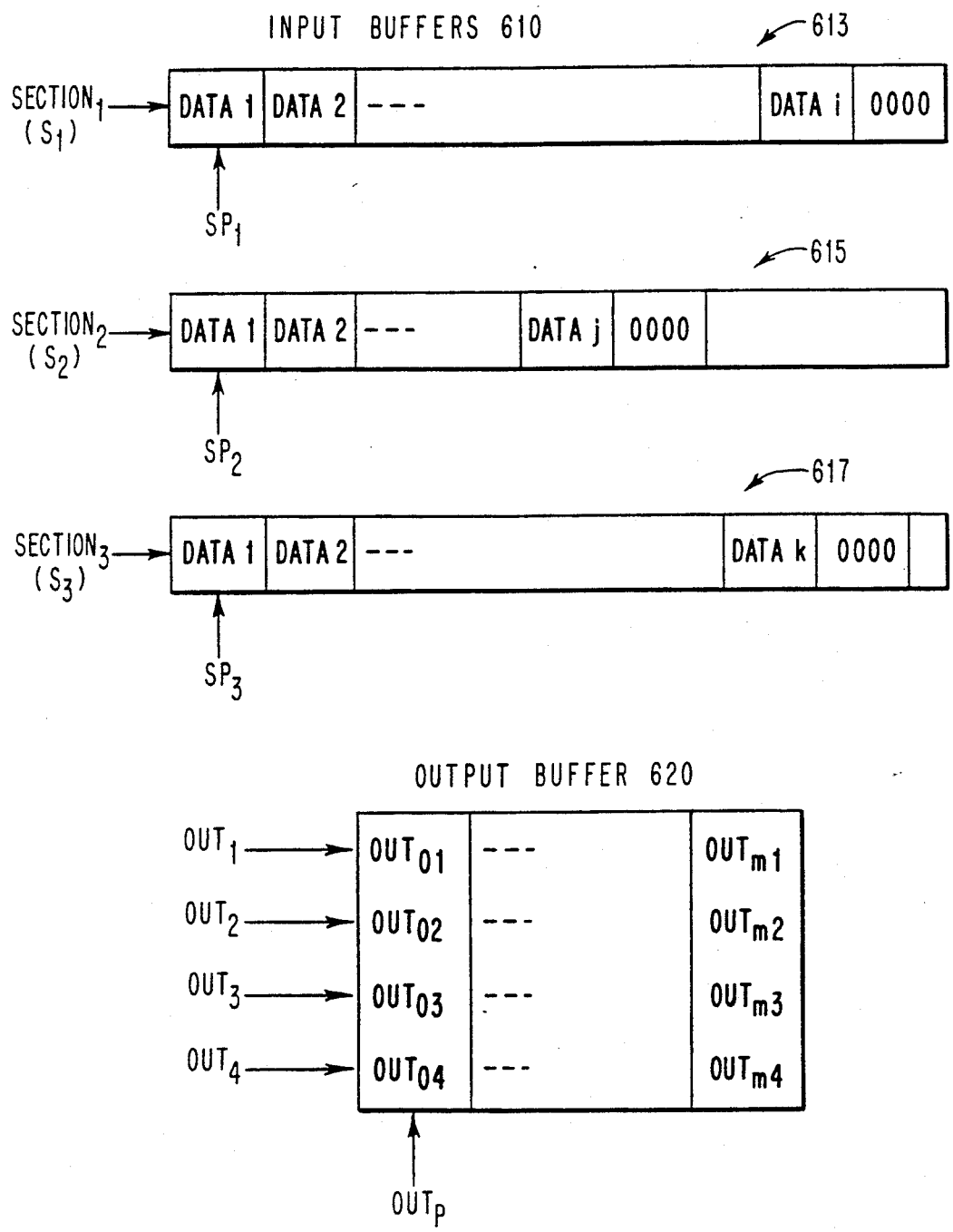
FIG. 6 depicts the organization of various input and output buffers and their corresponding pointers as used by my inventive method.

FIG. 6 depicts the organization of various input and output buffers and their corresponding pointers as used by my inventive method. Input buffers 610 consist of three separate buffers 613, 615 and 617 that hold the data records that exist in three successive sections, e.g. $S_1$, $S_2$ and $S_3$, of halftoned pel data that are currently being processed to yield corresponding grey scale values. A pointer, e.g. pointers $SP_1$, $SP_2$ and $SP_3$, is associated with each input buffer, e.g. buffers 613, 615 and 617, respectively, and points to the location within that buffer that is currently being processed. All three input buffers are the same length although, as discussed above, the three sections may, due to compression and trailing white spaces, contain different numbers (here shown as i, j and k) of individual data records. A delimiter "0000" is placed in each input buffer after the last data record stored therein in order to signal the end of the section. Output buffer 620 is an 4-by-m array which stores four lines of grey scale output values that result from processing three sections of image data. Each column in the output buffer holds four grey scale values, e.g. $OUT_1$, $OUT_2$, $OUT_3$ and $OUT_4$, that is associated with a corresponding 6-by-6 block of halftoned pel data. A pointer, OUTP, is used to point to the specific column within the output buffer that is currently being written.

Figure 7:
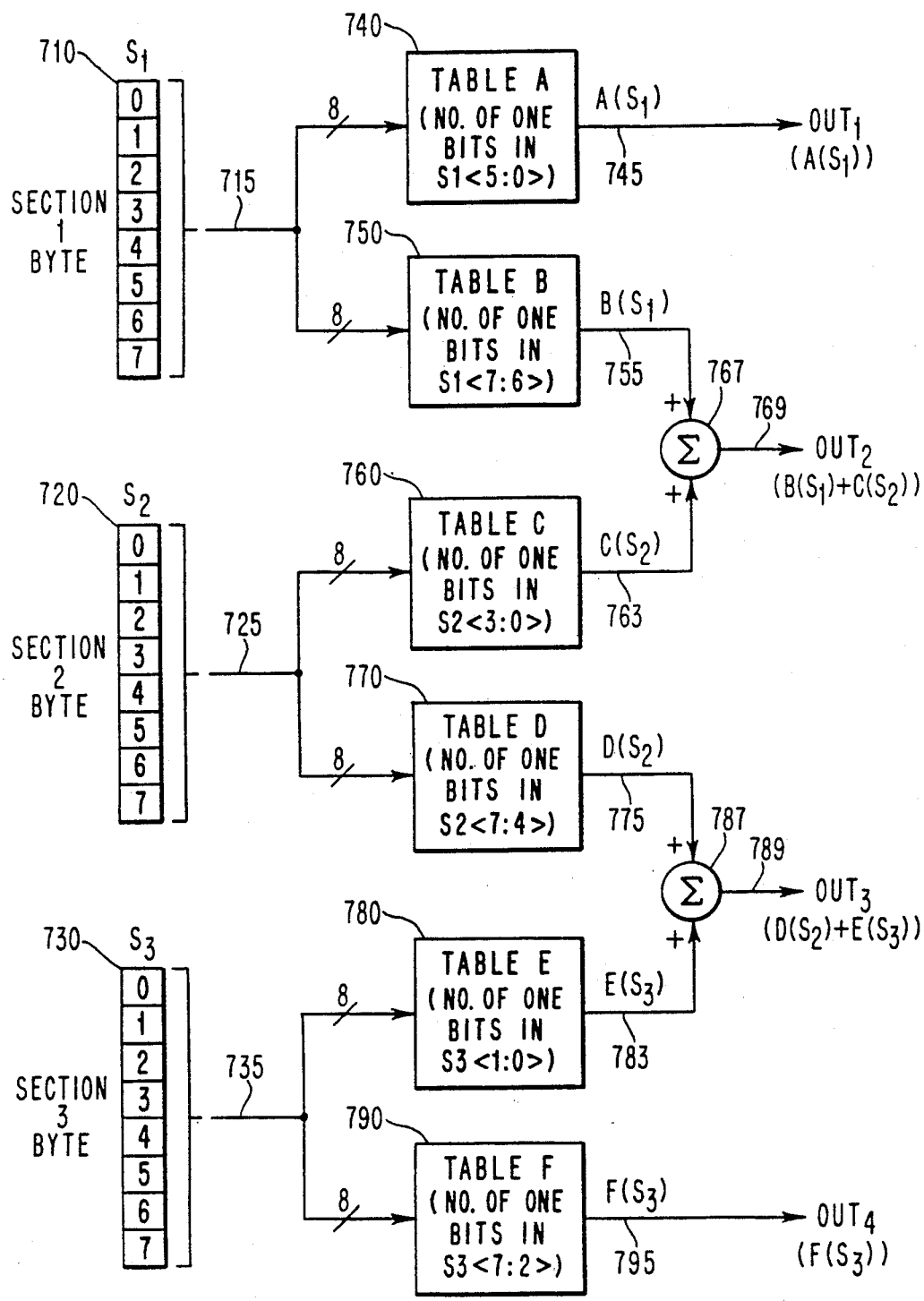
FIG. 7 depicts a high level simplified block diagram of my inventive method as applied to corresponding scans in three sections of bit-mapped halftone separation data.
Figure 9B:
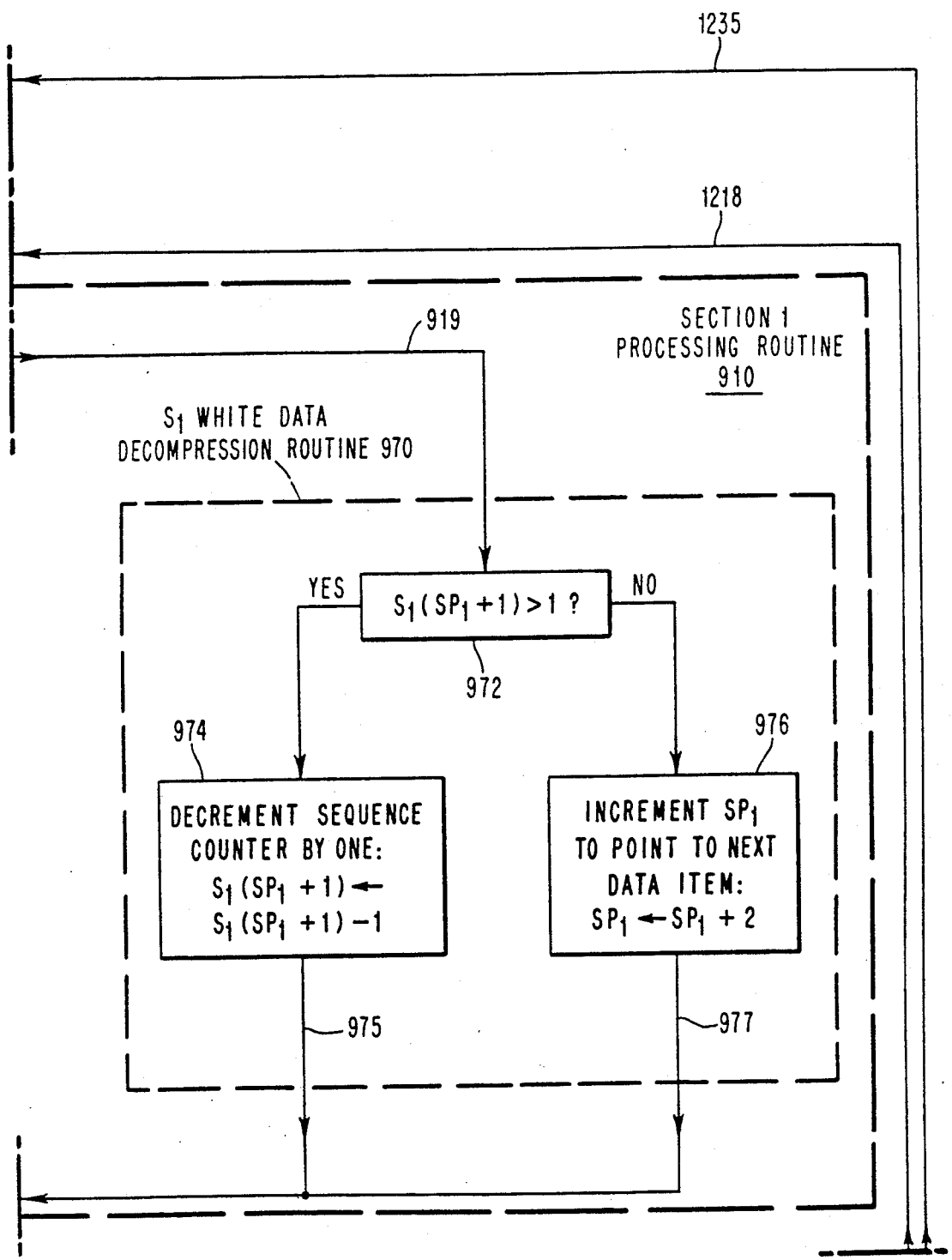
Figure 9C:
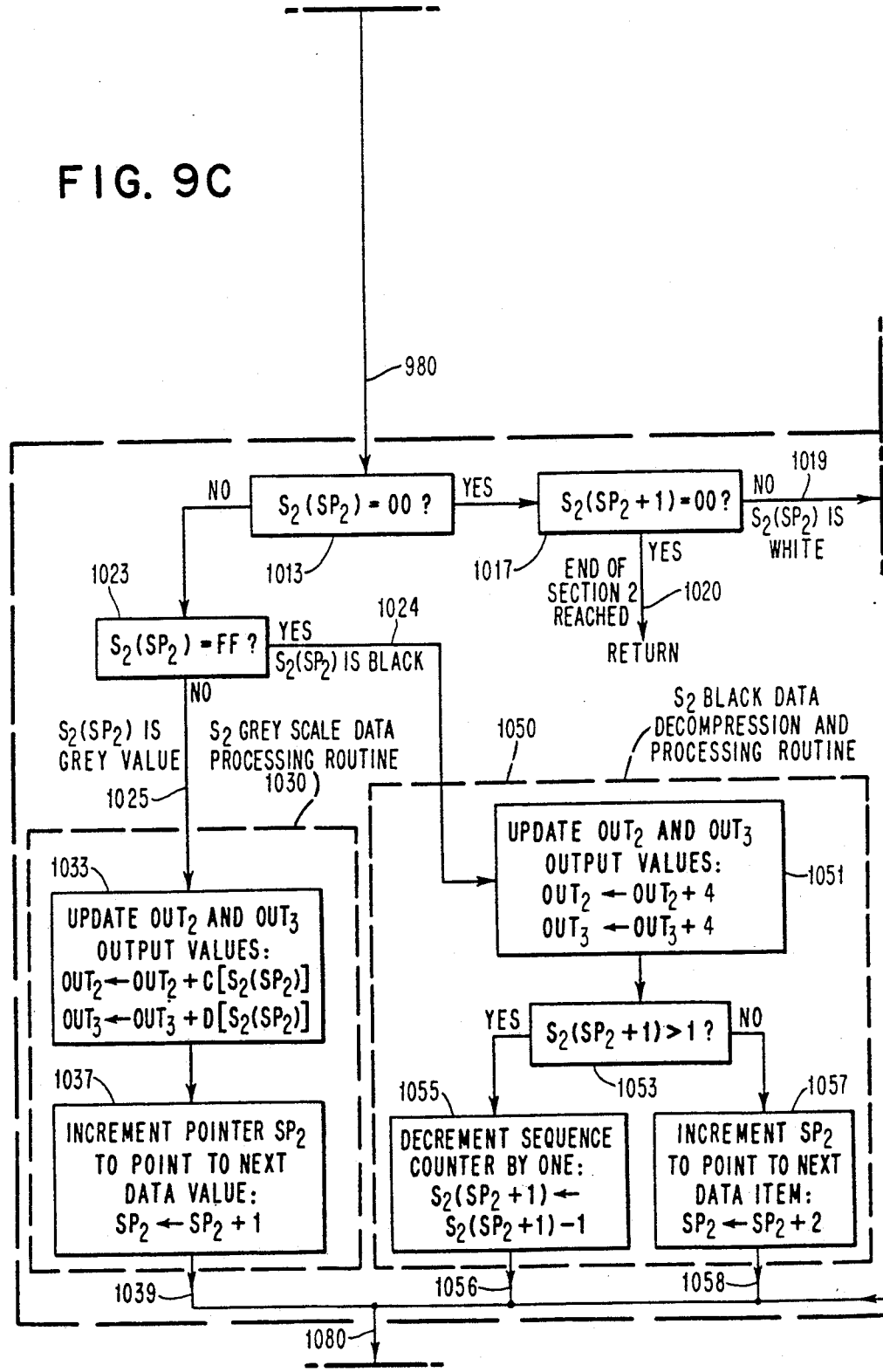
Figure 9D:
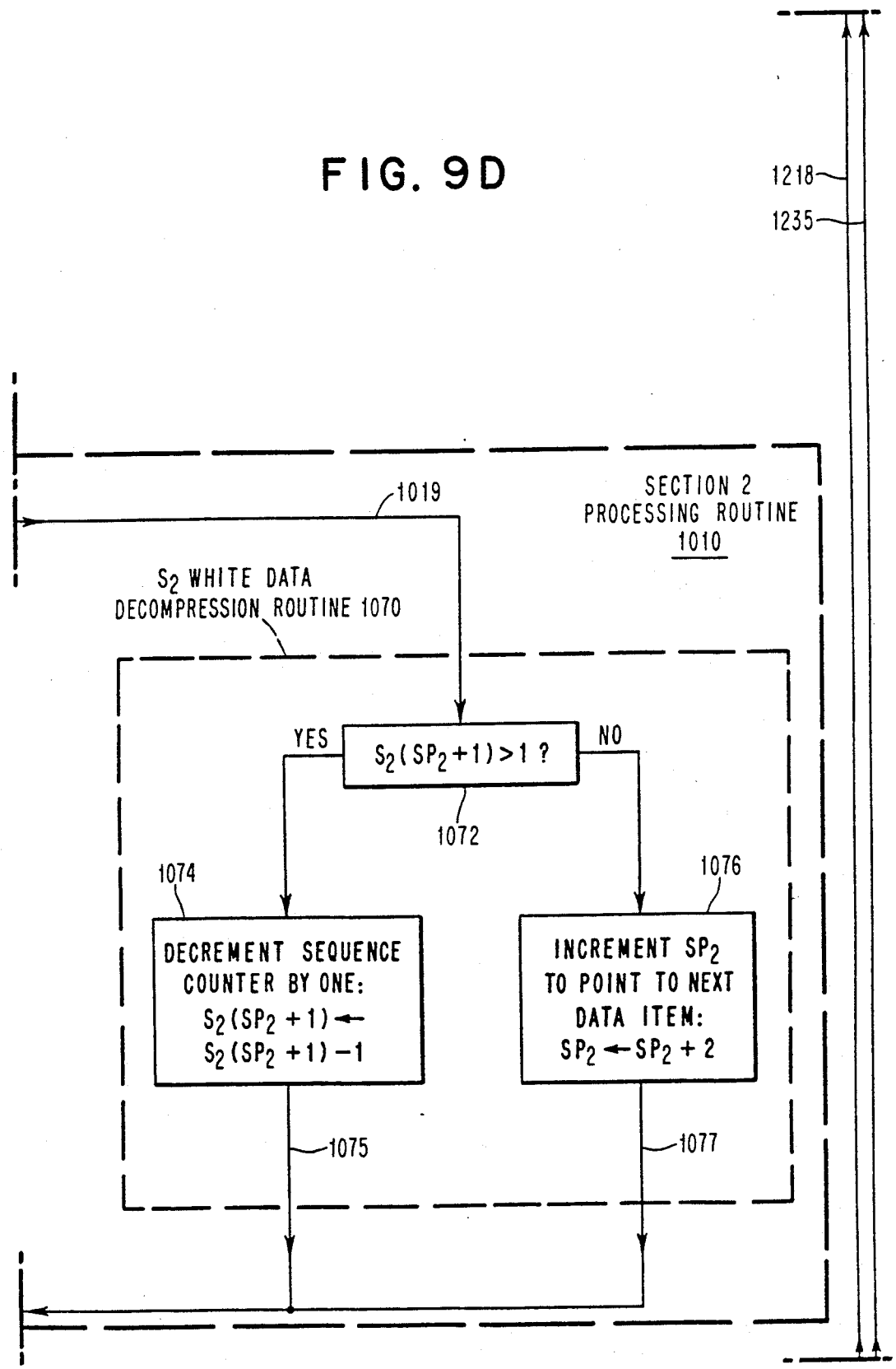
Figure 9E:
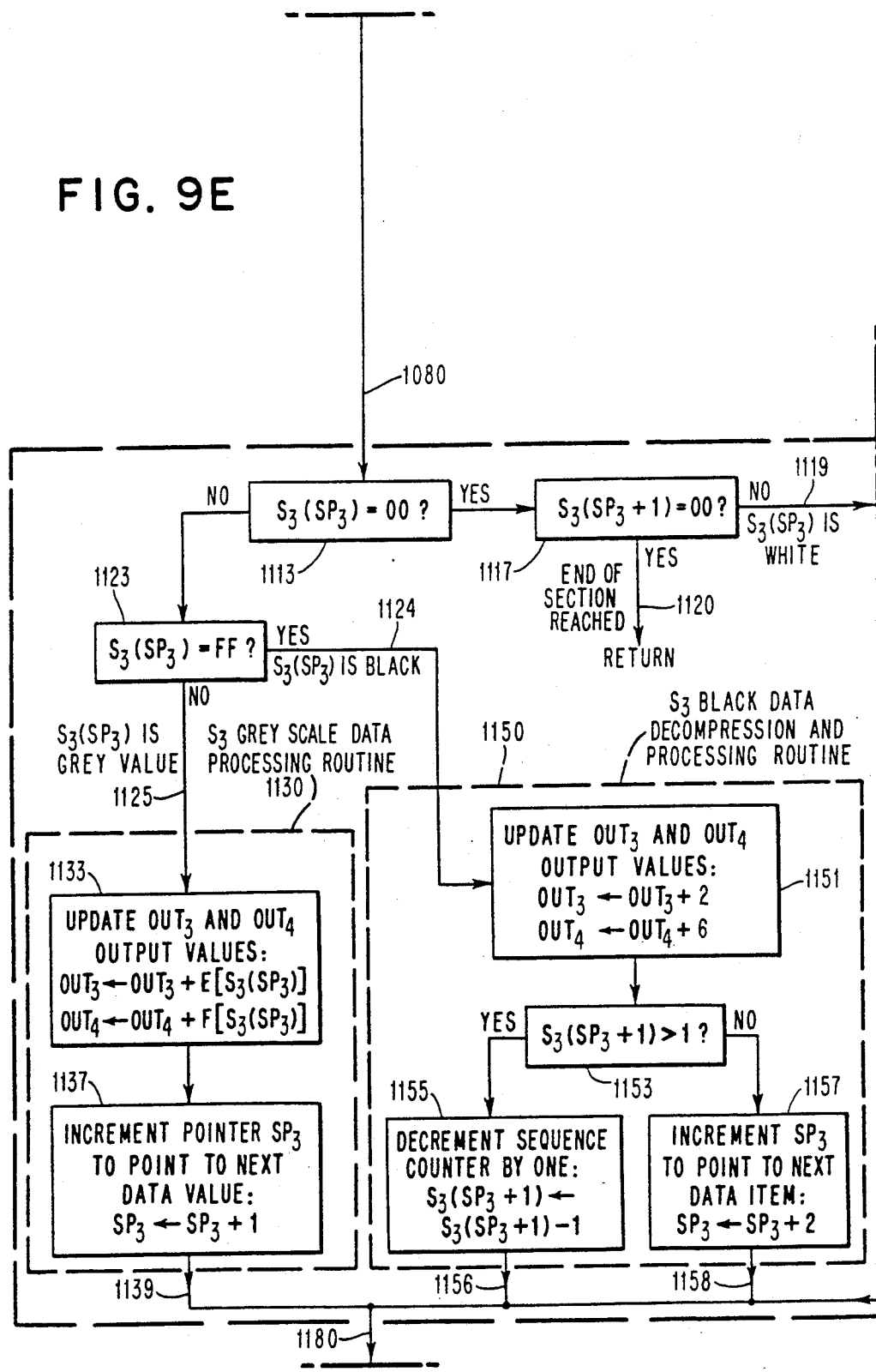
Figure 9F:
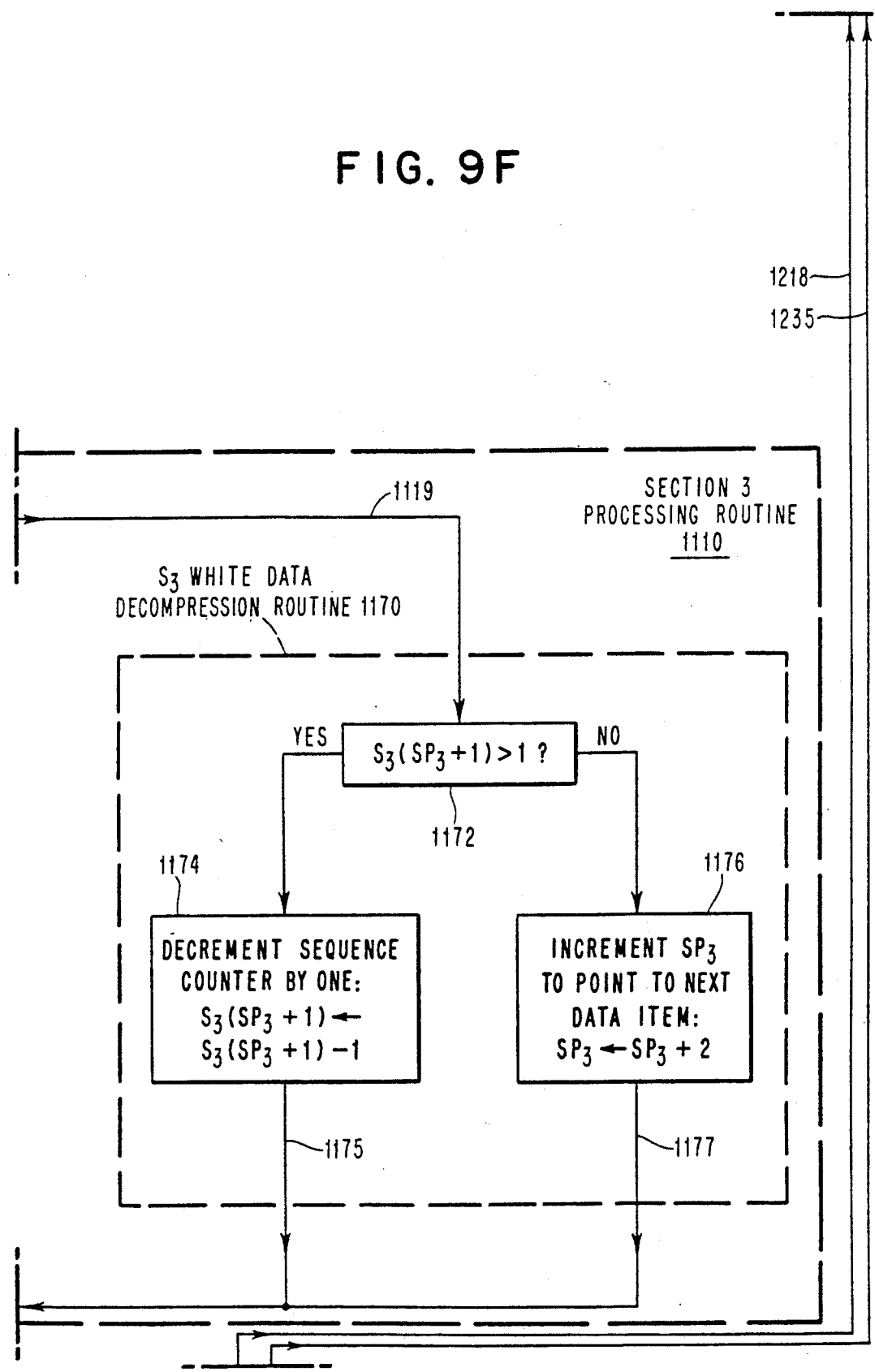
Figure 9G:
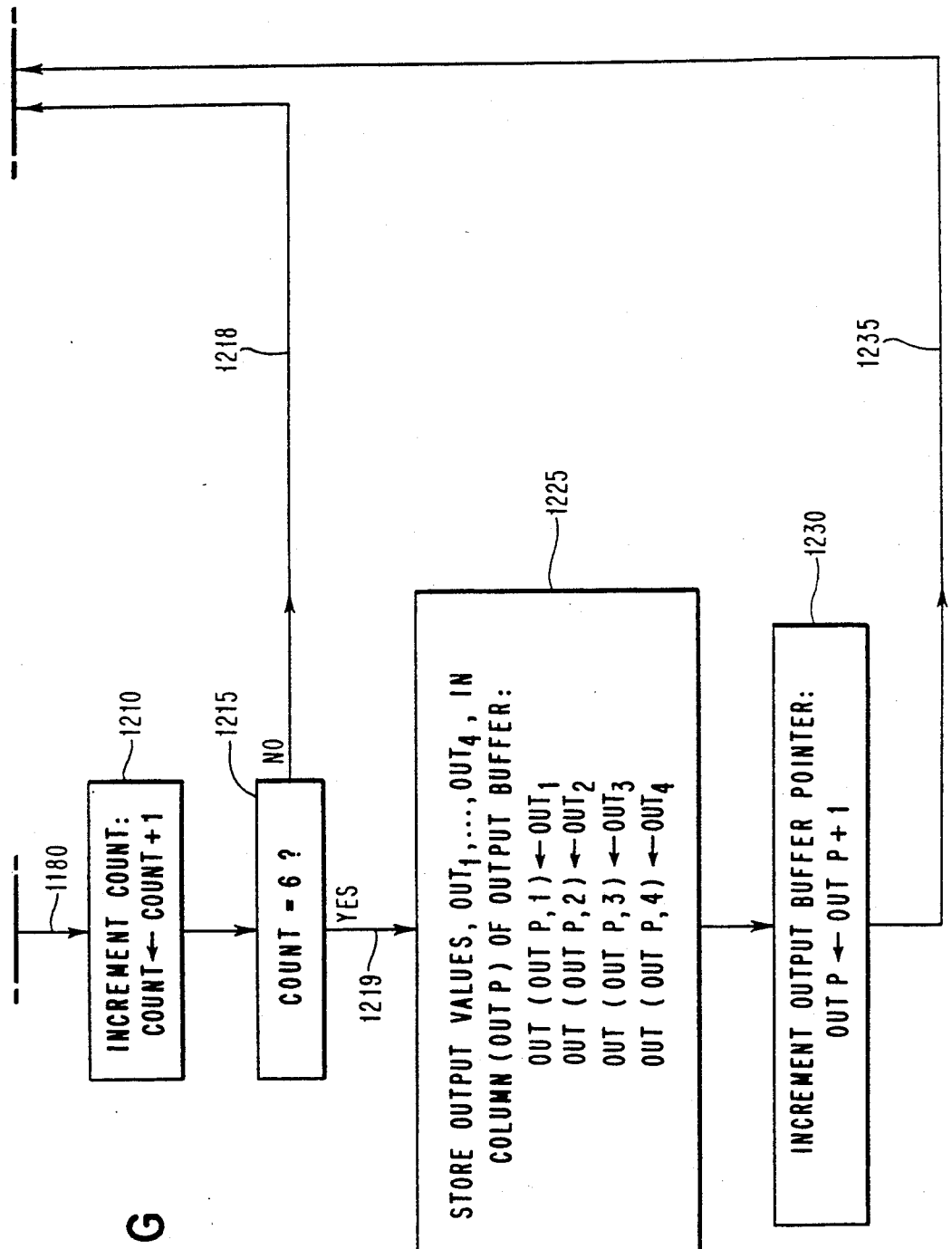

FIG. 7 depicts a high level simplified block diagram of my inventive method as applied to corresponding scans in three sections of bit-mapped halftone separation data. As shown, each set of three eight-bit bytes that represent three corresponding vertically aligned scans, $S_1$, $S_2$ and $S_3$, are applied, as symbolized by lines 715, 725 and 735, as input to six "256" value look up tables, specifically tables 740, 750, 760, 770, 780 and 790. Each byte is routed as input to two separate tables. Each table stores a number that represents the total of the pels that are "on" for the input pels of interest. For example, for each eight bit input in scan $S_1$, table 740 (also referred to as $TABLE_A$) provides a value, $A(S_1)$, that represents the number of input pels that are "1" (black) within bits 0 through 5 of scan $S_1$. This value is grey scale output value $OUT_1$ as shown by line 745. The same eight bits that form scan $S_1$ are also applied to table 750 (also referred to as $TABLE_B$) which provides a value, $B(S_1)$, that represents the number of input pels that are "1" (black) within bits 6 and 7 of scan $S_1$. For each eight bit input in scan $S_2$, table 760 (also referred to as $TABLE_C$) provides a value, $C(S_2)$, that represents the number of input pels that are "1" (black) within bits 0 through 3 of scan $S_2$. The output provided by tables 750 and 760, i.e. $B(S_1)$ and $C(S_2)$, are additively combined to yield grey scale output value $OUT_2$, as indicated by summer 767 and lines 755, 763 and 769. The eight bits that form scan $S_2$ are also applied to table 770 (also referred to as $TABLE_D$) which provides a value, $D(S_2)$, that represents the number of input pels that are "1" (black) within bits 4 through 7 of scan $S_2$. For each eight bit input in scan $S_3$, table 780 (also referred to as $TABLE_E$) provides a value, $E(S_3)$, that represents the number of input pels that are "1" (black) within bits 0 and 1 of scan $S_3$. The output provided by tables 770 and 780, i.e. $D(S_1)$ and $E(S_2)$, are additively combined to yield grey scale output value $OUT_3$, as indicated by summer 787 and lines 775, 783 and 789. Lastly, for each eight bit input in scan $S_3$, table 790 (also referred to as $TABLE_F$) provides a value, $F(S_3)$, that represents the number of input pels that are "1" (black) within bits 2 through 7 of scan $S_3$. This value is grey scale output value $OUT_4$ as indicated by line 795. These table look up and summing operations are iteratively performed for all six scans that form four successive corresponding 6-by-6 pel blocks with outputs $OUT_1$, $OUT_2$, $OUT_3$ and $OUT_4$, being accumulated (not shown in FIG. 7) over these six scans in order to form the four grey scale values that are associated with these blocks. The entire process is itself repeated for each successive set of three sections in the bit-mapped halftoned separation. Inasmuch as memory space is relatively inexpensive, all the tables are set to a common size of 256 values in order to eliminate the need to perform input masking operations and thereby advantageously reduce execution time.

FIG. 8 depicts a flow chart of Main Program 800 that, when executed in processor 20 shown in FIG. 1, implements my inventive method. As shown, upon entry into this routine, execution proceeds to block 810. This block, when executed, loads all six look up tables, i.e. $TABLE_A$, $TABLE_B$, ..., $TABLE_F$, with their appropriate values. Once this occurs, block 820 is executed to read the X DIM and Y DIM fields in the header record of a selected CDPF print file for which a "preview" image will be formed. These dimensions are then used by the operating system in the processor to allocate sufficient memory space for use as temporary buffers, e.g. the input and output buffers. Once this has occurred, execution proceeds to block 830 which, when executed, reads a sufficient number of data records from the CDPF print file to constitute three complete sections. The data records for each section are appropriately loaded into a separate input buffer. This block also appends the delimiter "0000" after the last data record in each input buffer in order to signal the end of the data for the section stored therein. Use of such a delimiter eliminates the need to keep track of the number of data records in each section, thereby advantageously saving processing time. After block 830 has fully executed, execution proceeds to decision block 840. This decision block, when executed, determines if an end of file delimiter was reached while data records were being read by block 830 for any of the three sections. If the end of file delimiter was reached, then execution exits from main program 800, via YES path 843 that emanates from decision block 840. At this point, the bit-mapped halftone separation has been converted into appropriate grey scale values and hence processing of this separation is now complete. Alternatively, if an end of file delimiter was not reached, then execution proceeds, via NO path 847, to block 850. Block 850, when executed, invokes Process_3_Sections routine 900 (which will be discussed below in conjunction with FIGS. 9A–9G) to process the three sections of image data to generate four lines of corresponding grey scale values for subsequent display. Once this routine has fully executed, execution loops back, as shown in FIG. 8, via path 855, to block 830 in order to read data records for the next three sections and so on.

A flowchart of Process_3_Sections Routine 900 that is executed as part of Main Program 800 shown in FIG. 8 is collectively depicted in FIGS. 9A–9G, for which the correct alignment of the drawing sheets for these figures is shown in FIG. 9. As noted above, this routine processes three complete sections of bit-mapped halftoned separation data to yield four complete lines of grey scale values.

As shown, upon entry into routine 900, execution proceeds to block 901 which, when executed, initializes the contents of the input pointers, $SP_1$, $SP_2$ and $SP_3$, and the output pointer, OUTP, to zero, i.e. the first location in each of these buffers. Thereafter, execution proceeds to block 903 which initializes the contents of four output variables, $OUT_1$, $OUT_2$, $OUT_3$ and $OUT_4$, and a loop counter, COUNT, to zero. Once this has occurred, execution enters Section 1 Processing Routine 910 which processes the scan data for the first of the three sections.

In particular, upon entry into routine 910, execution first proceeds to decision block 913 which reads and tests the contents of the input buffer that stores the first section, i.e. buffer $S_1$, at the contents specified by pointer $SP_1$ (which at the start of the first pass through routine 910 points to the first location in section 1), to determine if the data stored at this location equals "00". If the contents of this location equal the value "00", then this could either mean that a current data record contains a run of compressed white scans or that an end of section delimiter ("0000") has been reached. In the event that this location contains "00", then execution proceeds, via the YES path emanating from decision block 913, to decision block 917. This latter decision block, when executed, reads and tests the contents of the next successive byte in the first section to determine if it too contains "00". In the event this next byte also contains "00", then an end of section delimiter has been reached. This signifies that all the image data for the first section has been processed and hence the grey scale values for the current three sections have been generated. At this point, execution exits from routine 900, via YES path 920 that emanates from decision block 917. Alternatively, if the contents of this successive data byte do not equal "00", then compressed white scan data occurs. In this case, decision block 917 routes execution, via NO path 919, to $S_1$ White Data Decompression Routine 970 to appropriately process the compressed white scan data. Upon entry into routine 970, execution proceeds to decision block 972 to determine whether a single white scan exists in the current data record. Specifically, this decision block, when executed, tests whether the contents of this successive data byte are greater than one. If the contents are greater than one, then this byte forms the second byte, i.e. the sequence counter, in a compression sequence and specifies the number of successively occurring white scans. As such, in the event these contents are greater than one, then decision block 972 routes execution, via its YES path, to block 974. This latter block, when executed, merely decrements the contents of this sequence counter by one and stores the decremented value back into its corresponding byte in the first input buffer. Inasmuch as only the occurrences of black pels within any block are accumulated to generate appropriate grey scale output values, no change in any of the four output values occurs whenever a white scan is encountered, as here. Consequently, after the sequence counter has been decremented, execution merely exits from routine 970, via path 975, and proceeds to path 980. Alternatively, if the contents of the successive byte are not greater than one, then merely a single white scan exists in the current data record. In this case, execution proceeds, via the NO path emanating from decision block 972, to block 976. This latter block, when executed, merely increments the contents of pointer $SP_1$ by two to point to the beginning of the next successive data record in input buffer $S_1$. Once this occurs, execution exits, via path 977, from $S_1$ White Data Decompression Routine 970 and proceeds to path 980.

Now, alternatively, in the event that decision block 913 determines that the contents of buffer $S_1$ at the location specified by pointer $SP_1$ are not "00", i.e. corresponding to either a black or grey scan, then this decision block routes execution, via its NO path, to decision block 923. This latter decision block tests whether the contents at this location equal "FF", i.e. corresponding to a black scan. In the event that the contents do not equal "FF", then a data record for a grey scan exists at this location. Accordingly, decision block 923 routes execution, via NO path 925, to $S_1$ Grey Scale Data Processing Routine 930. Upon entry into this routine, execution proceeds to block 933. This block accumulates the number of black pels that form the grey scan data occurring within the six pels that form cluster $540_A$ (see FIG. 5) and occur at the current location in the first section. To do this, as shown in FIGS. 9A-9G, block 933 accesses $TABLE_A$ with the grey scan data as input. The value of variable $OUT_1$ is then updated with the resulting number provided by this table. Block 933 also accumulates the number of black pels that form the grey scan data occurring within the two pels that form cluster $540_B$ (see FIG. 5) and occur at the current location in the first section. To do this, as shown in FIGS. 9A-9G, this block accesses $TABLE_B$ with the grey scan data as input. The value of variable $OUT_2$ is then updated with the resulting number provided by this table. Once these two variables have been updated, execution passes to block 937 which increments the value of pointer $SP_1$ by one to point to the beginning of the next data record in section $S_1$. Thereafter, execution exits from Grey Scale Data Processing Routine 930, via path 939, and proceeds to path 980.

Alternatively, in the event that decision block 923 determines that the contents of buffer $S_1$ at the location specified by pointer $SP_1$ equal "FF", i.e. corresponding to a black scan, then this decision block routes execution, via YES path 924, to $S_1$ Black Data Decompression and Processing Routine 950. Upon entry into this routine, execution proceeds to block 951 to appropriately update the value of variables $OUT_1$ and $OUT_2$ given the black scan data. Since all eight pels are "on" for a black scan, i.e. the six pels in cluster $540_A$ (see FIG. 5) are "1" and the two pels in cluster $540_B$ are also "1", this updating operation merely involves adding the values "6" and "2" to the current contents of variables $OUT_1$ and $OUT_2$. In this instance, no table look up operations are necessary. Thereafter, as shown in FIGS. 9A-9G, execution proceeds to decision block 953. This decision block, similar to decision block 972, as discussed above, determines whether a single black scan data exists in the current data record for the second section. Specifically, decision block 953, when executed, reads the contents of the next successive data byte and tests whether the contents of this successive byte are greater than one. If the contents are greater than one, then this byte forms the second byte, i.e. the sequence counter, in a compression sequence and specifies the number of successively occurring black scans. As such, in the event these contents are greater than one, then decision block 953 routes execution, via its YES path, to block 955. This latter block, when executed, merely decrements the contents of this sequence counter by one and stores the decremented value back into its corresponding byte in the input buffer. After the sequence counter has been decremented, execution merely exits from routine 950, via path 956, and proceeds to path 980. Alternatively, if the contents of the successive byte are not greater than one, then merely a single black scan exists in the current data record. In this case, execution proceeds, via the NO path emanating from decision block 953, to block 957. This latter block, when executed, merely increments the contents of pointer $SP_1$ by two to point to the beginning of the next successive data record in input buffer $S_1$. Once this occurs, execution exits, via path 958, from $S_1$ Black Data Decompression Routine 950 and proceeds to path 980.

Once execution reaches path 980, the current scan in input buffer $S_1$ has been fully processed. At this point, the corresponding scan in buffer $S_2$ is processed by Section 2 Processing Routine 1010 followed by processing of the corresponding scan in buffer $S_3$ by Section 3 Processing Routine 1110. Routines 1010 and 1110 provide the same basic processing operations as does Section 1 Processing Routine 910.

Specifically, after execution reaches path 980, execution enters Section 2 Processing Routine 1010 which processes the scan data for the second of the three sections. In particular, upon entry into routine 1010, execution first proceeds to decision block 1013 which reads and tests the contents of the input buffer that stores the second section, i.e. buffer $S_2$, at the contents specified by pointer $SP_2$ (which at the start of the first pass through routine 1010 points to the first location in section 2), to determine if the data stored at this location equals "00". If the contents of this location equal the value "00", then this could either mean that a current data record contains a run of compressed white scans or that an end of section delimiter ("0000") has been reached. In the event that this location contains "00", then execution proceeds, via the YES path emanating from decision block 1013, to decision block 1017. This latter decision block, when executed, reads and tests the contents of the next successive byte in the second section to determine if it too contains "00". In the event this next byte also contains "00", then an end of section delimiter has been reached. This signifies that all the image data for the second section has been processed and the grey scale values for the current three sections have been generated. At this point, execution exits from routine 900, via YES path 1020 that emanates from decision block 1017. Alternatively, if the contents of this successive data byte do not equal "00", then compressed white scan data occurs. In this case, decision block 1017 routes execution, via NO path 1019, to $S_2$ White Data Decompression Routine 1070 to appropriately process the compressed white scan data. Upon entry into routine 1070, execution proceeds to decision block 1072 to determine whether a single white scan exists in the current data record. Specifically, this decision block, when executed, tests whether the contents of this successive data byte are greater than one. If the contents are greater than one, then this byte forms the second byte, i.e. the sequence counter, in a compression sequence and specifies the number of successively occurring white scans. As such, in the event these contents are greater than one, then decision block 1072 routes execution, via its YES path, to block 1074. This latter block, when executed, merely decrements the contents of this sequence counter by one and stores the decremented value back into its corresponding byte in the second input buffer. Inasmuch as only the occurrences of black pels within any block are accumulated to generate appropriate grey scale output values, no change in any of the four output values occurs whenever a white scan is encountered, as here. Consequently, after the sequence counter has been decremented, execution merely exits from routine 1070, via path 1075, and proceeds to path 1080. Alternatively, if the contents of the successive byte are not greater than one, then merely a single white scan exists in the current data record. In this case, execution proceeds, via the NO path emanating from decision block 1072, to block 1076. This latter block, when executed, merely increments the contents of pointer $SP_2$ by two to point to the beginning of the next successive data record in input buffer $S_2$. Once this occurs, execution exits, via path 1077, from $S_2$ White Data Decompression Routine 1070 and proceeds to path 1080.

Now, alternatively, in the event that decision block 1013 determines that the contents of buffer $S_2$ at the location specified by pointer $SP_2$ are not "00", i.e. corresponding to either a black or grey scan, then this decision block routes execution, via its NO path, to decision block 1023. This latter decision block tests whether the contents at this location equal "FF", i.e. corresponding to a black scan. In the event that the contents do not equal "FF", then a data record for a grey scan exists at this location. Accordingly, decision block 1023 routes execution, via NO path 1025, to $S_2$ Grey Scale Data Processing Routine 1030. Upon entry into this routine, execution proceeds to block 1033. This block accumulates the number of black pels that form the grey scan data occurring within the four pels that form cluster $540_C$ (see FIG. 5) and occur at the current location in the second section. To do this, as shown in FIGS. 9A-9G, block 1033 accesses $TABLE_C$ with the grey scan data as input. The value of variable $OUT_2$ is then updated with the resulting number provided by this table. Block 1033 also accumulates the number of black pels that form the grey scan data occurring within the four pels that form cluster $540_D$ (see FIG. 5) and occur at the current location in the second section. To do this, as shown in FIGS. 9A-9G, this block accesses $TABLE_D$ with the grey scan data as input. The value of variable $OUT_3$ is then updated with the resulting number provided by this table. Once these two variables have been updated, execution passes to block 1037 which increments the value of pointer $SP_2$ by one to point to the beginning of the next data record in section $S_2$. Thereafter, execution exits from Grey Scale Data Processing Routine 1030, via path 1039, and proceeds to path 1080.

Alternatively, in the event that decision block 1023 determines that the contents of buffer $S_2$ at the location specified by pointer $SP_2$ equal "FF", i.e. corresponding to a black scan, then this decision block routes execution, via YES path 1024, to $S_2$ Black Data Decompression and Processing Routine 1050. Upon entry into this routine, execution proceeds to block 1051 to appropriately update the value of variables $OUT_2$ and $OUT_3$ given the black scan data. Since all eight pels are "on" for a black scan, i.e. the four pels in cluster 540C (see FIG. 5) are "1" and the four pels in cluster 540D are also "1", this updating operation merely involves adding the values "4" and "4" to the current contents of variables OUT2 and OUT3. In this instance, no table look up operations are necessary. Thereafter, as shown in FIGS. 9A-9G, execution proceeds to decision block 1053. This decision block, similar to decision block 1072, as discussed above, determines whether a single black scan exists in the current data record. Specifically, decision block 1053, when executed, reads the contents of the next successive data byte and tests whether the contents of this successive byte are greater than one. If the contents are greater than one, then this byte forms the second byte, i.e. the sequence counter, in a compression sequence and specifies the number of successively occurring black scans. As such, in the event the contents are greater than one, then decision block 1053 routes execution, via its YES path, to block 1055. This latter block, when executed, merely decrements the contents of this sequence counter by one and stores the decremented value back into its corresponding byte in the input buffer. After the sequence counter has been decremented, execution merely exits from routine 1050, via path 1056, and proceeds to path 1080. Alternatively, if the contents of the successive byte are not greater than one, then merely a single black scan exists in the current data record. In this case, execution proceeds, via the NO path emanating from decision block 1053, to block 1057. This latter block, when executed, merely increments the contents of pointer SP2 by two to point to the beginning of the next successive data record in input buffer S2. Once this occurs, execution exits, via path 1058, from S2 Black Data Decompression Routine 1050 and proceeds to path 1080.

Once execution reaches path 1080, the current scan in input buffer S2 has been fully processed. As noted above, execution then proceeds, via path 1080, to Section 3 Processing Routine 1110 in order to process the corresponding scan in input buffer S3 for the third of the three sections. In particular, upon entry into routine 1110, execution first proceeds to decision block 1113 which reads and tests the contents of the input buffer that stores the third section, i.e. buffer S3, at the contents specified by pointer SP3 (which at the start of the first pass through routine 1110 points to the first location in section 3), to determine if the data stored at this location equals "00". If the contents of this location equal the value "00", then this could either mean that a current data record in the third section contains a run of compressed white scans or that an end of section delimiter ("0000") has been reached. In the event that this location contains "00", then execution proceeds, via the YES path emanating from decision block 1113, to decision block 1117. This latter decision block, when executed, reads and tests the contents of the next successive byte in the third section to determine if it too contains "00". In the event this next byte also contains "00", then an end of section delimiter has been reached. This signifies that all the image data for the third section has been processed and the grey scale values for the current three sections have been generated. At this point, execution exits from routine 900, via YES path 1120 that emanates from decision block 1117. Alternatively, if the contents of this successive data byte do not equal "00", then compressed white scan data occurs. In this case, decision block 1117 routes execution, via NO path 1119, to S3 White Data Decompression Routine 1170 to appropriately process the compressed white scan data. Upon entry into routine 1170, execution proceeds to decision block 1172 to determine whether a single white scan exists in the current data record. Specifically, this decision block, when executed, tests whether the contents of this successive data byte are greater than one. If the contents are greater than one, then this byte forms the second byte, i.e. the sequence counter, in a compression sequence and specifies the number of successively occurring white scans. As such, in the event these contents are greater than one, then decision block 1172 routes execution, via its YES path, to block 1174. This latter block, when executed, merely decrements the contents of this sequence counter by one and stores the decremented value back into its corresponding byte in the third input buffer. Inasmuch as only the occurrences of black pels within any block are accumulated to generate appropriate grey scale output values, no change in any of the four output values occurs whenever a white scan is encountered, as here. Consequently, after the sequence counter has been decremented, execution merely exits from routine 1170, via path 1175, and proceeds to path 1180. Alternatively, if the contents of the successive byte are not greater than one, then merely a single white scan exists in the current data record. In this case, execution proceeds, via the NO path emanating from decision block 1172, to block 1176. This latter block, when executed, merely increments the contents of pointer SP3 by two to point to the beginning of the next successive data record in input buffer S3. Once this occurs, execution exits, via path 1177, from S3 White Data Decompression Routine 1170 and proceeds to path 1180.

Now, alternatively, in the event that decision block 1113 determines that the contents of buffer S3 at the location specified by pointer SP3 are not "00", i.e. corresponding to either a black or grey scan, then this decision block routes execution, via its NO path, to decision block 1123. This latter decision block tests whether the contents at this location equal "FF", i.e. corresponding to a black scan. In the event that the contents do not equal "FF", then a data record for a grey scan exists at this location. Accordingly, decision block 1123 routes execution, via NO path 1125, to S3 Grey Scale Data Processing Routine 1130. Upon entry into this routine, execution proceeds to block 1133. This block accumulates the number of black pels that form the grey scan data occurring within the two pels that form cluster $540_E$ (see FIG. 5) and occur at the current location in the third section. To do this, as shown in FIGS. 9A-9G, block 1133 accesses $TABLE_E$ with the grey scan data as input. The value of variable OUT3 is then updated with the resulting number provided by this table. Block 1133 also accumulates the number of black pels that form the grey scan data occurring within the six pels that form cluster $540_F$ (see FIG. 5) and occur at the current location in the third section. To do this, as shown in FIGS. 9A-9G, this block accesses $TABLE_F$ with the grey scan data as input. The value of variable OUT4 is then updated with the resulting number provided by this table. Once these two variables have been updated, execution passes to block 1137 which increments the value of pointer SP3 by one to point to the beginning of the next data record in section S3. Thereafter, execution exits from Grey Scale Data Processing Routine 1130, via path 1139, and proceeds to path 1180.

Alternatively, in the event that decision block 1123 determines that the contents of buffer S3 at the location specified by pointer SP3 equal "FF", i.e. corresponding to a black scan, then this decision block routes execution, via YES path 1124, to S3 Black Data Decompression and Processing Routine 1150. Upon entry into this routine, execution proceeds to block 1151 to appropriately update the value of variables OUT$_3$ and OUT$_4$ given the black scan data. Since all eight pels are "on" for a black scan, i.e. the two pels in cluster 540$_E$ (see FIG. 5) are "1" and the six pels in cluster 540$_F$ are also "1", this updating operation merely involves adding the values "2" and "6" to the current contents of variables OUT$_3$ and OUT$_4$. In this instance, no table look up operations are necessary. Thereafter, as shown in FIGS. 9A-9G, execution proceeds to decision block 1153. This decision block, similar to decision block 1172, as discussed above, determines whether a single black scan data exists in the current data record in the third section. Specifically, decision block 1153, when executed, reads the contents of the next successive data byte and tests whether the contents of this successive byte are greater than one. If the contents are greater than one, then this byte forms the second byte, i.e. the sequence counter, in a compression sequence and specifies the number of successively occurring black scans. As such, in the event the contents are greater than one, then decision block 1153 routes execution, via its YES path, to block 1155. This latter block, when executed, merely decrements the contents of this sequence counter by one and stores the decremented value back into its corresponding byte in the input buffer. After the sequence counter has been decremented, execution merely exits from routine 1150, via path 1156, and proceeds to path 1180. Alternatively, if these contents of the successive byte are not greater than one, then merely a single black scan exists in the current data record. In this case, execution proceeds, via the NO path emanating from decision block 1153, to block 1157. This latter block, when executed, merely increments the contents of pointer SP$_3$ by two to point to the beginning of the next successive data record in input buffer S$_3$. Once this occurs, execution exits, via path 1158, from S$_3$ Black Data Decompression Routine 1150 and proceeds to path 1180.

At this point, three corresponding scans in the three sections have been processed. As such, execution proceeds, via path 1180, to block 1210 which, when executed, increments the current contents of loop counter COUNT by one. Once this occurs, execution proceeds to decision block 1215. This decision block determines if six successively occurring sets of three vertically contiguous scans occurring in the three sections have been processed, i.e. whether four vertically contiguous 6-by-6 blocks of pels have been converted into appropriate grey scale values. In the event that six successive scans from each section have not been processed (i.e. the contents of counter COUNT are less than the value "6"), then decision block 1215 routes execution, via NO path 1218, back to Section 1 Processing Routine 910 to begin processing the next set of three corresponding scans. If, however, six successive scans from each section have been processed and as such the contents of counter COUNT now equal the value "6", then decision block 1215 routes execution, via YES path 1219, to execution block 1225. This latter block, when executed, writes the current values of variables OUT$_1$, OUT$_2$, OUT$_3$, and OUT$_4$ as the output grey scale values in corresponding locations, i.e. OUT (OUTP,1), OUT (OUTP,2), OUT (OUTP,3) and OUT (OUTP,4), within a column in the output buffer specified by the current contents of the output buffer pointer OUTP. Once this occurs, execution proceeds to block 1230 which, when executed, increments the contents of output buffer pointer OUTP by one to point to the next column to be written in the output buffer. After this has occurred, execution loops back, via path 1235, to block 903 in order to process the next six sets of three vertically contiguous scans in the three sections to generate the next column of four grey scale output values and so on.

As can be appreciated, my inventive process requires only 1 ADD operation for every white scan, 3 ADD operations for every black scan and 3 ADD operations and 2 table look up operations for every grey scan. Assuming that 70% of the area within a typical document is white, 15% of the area is black and the remaining 15% is grey, then the amount of calculations required by my method per input byte is only 1.6 ADD operations and 0.3 look up operations which advantageously results in sufficiently fast operation.

To test my inventive method, I appropriately programmed an IBM system 370 computer operating under the CMS operating system to generate four bytes of output grey scale data for every 18 bytes of halftoned bit-mapped pel data (at a resolution of 600 dots/inch) in order to achieve a 4.5 to 1 reduction in data. The resulting output data provided a good quality readable grey scale image when subsequently displayed on an IBM 8514 monitor.

Clearly, those skilled in the art realize that in using my inventive method the reduction factor between the resolution of the bit-mapped document and the displayed image needs to be chosen to produce a readable image that has a reasonable size for the monitor on which it will be displayed. As the reduction factor is increased for a given amount of output data, then the size of the image will decrease however an increased number of grey values can be used to depict the displayed image. This is evident from the following illustrative table (with n equalling six being discussed in detail above):

| n | M (bytes, bits) | T (tables) | s grey scale output bytes from tables | resolution reduction |
|---|---|---|---|---|
| 8 | 1, 8 | 1 | 1 | 64:1 |
| 6 | 3, 24 | 6 | 4 | 36:1 |
| 4 | 1, 8 | 2 | 2 | 16:1 |
| 3 | 3, 24 | 10 | 8 | 9:1 |
| 2 | 1, 8 | 4 | 4 | 4:1 | where:
n=the number of pels in each direction of a square block being converted to a single grey scale value;
M=the least number of bytes whose bits are evenly divisible by n; and
T=the number of unique tables necessary to calculate the sums using M input bytes as their index.
with the entries in all the tables equalling the number of pel bits that are "1" in the respective portion of the index for which the table is to provide an output. The number, s, of lines of grey scale values provided by the tables upon indexing through a respective horizontal strip of M vertical bytes, where the number s equals 8*M/n, are appropriately assembled to produce a "preview" image at a reduced resolution.

Furthermore, my inventive method is not limited to providing a "preview" image for display on a video monitor. Rather, my method can be used to convert a relatively high resolution bit-mapped file into an appropriately lower resolution grey scale file that can drive nearly any one of a variety of different output devices, e.g. a dot matrix printer, a laser printer, an ink jet printer or other device, that is capable of producing a single color grey scale graphics image with a requisite number of tonal variations (shades) of that color.

Although a preferred embodiment of the present invention has been shown and described herein, many other varied embodiments that incorporate the teachings of the present invention may be easily constructed by those skilled in the art.

I claim:

1. In a system that provides a high resolution bit-mapped pattern formed of single bit pels, a method of generating a reduced resolution grey scale "preview" image from said bit-mapped pattern, wherein the "preview" image substantially depicts how the bit-mapped pattern would appear when printed at said high resolution, said method comprising the steps of:

forming successive groups of a pre-defined number of vertically contiguous blocks of pels from said bit-mapped pattern, such that said groups are arranged horizontally across said pattern and form one of a plurality of contiguous horizontal strips of said bit-mapped pattern, wherein each block has a pre-determined number of pels that exist within said bit-mapped pattern;

determining a corresponding multi-bit grey scale value, in response to the number of pels that have a common binary value and are situated in each one of said blocks in said one strip, so as to produce a corresponding number of horizontal lines of successive grey-scale values in said "preview" image such that each of said grey scale values corresponds to a different one of said blocks and said grey scale values occur in the same order as said blocks corresponding thereto, wherein said determining step comprising the steps of:

successively applying each pre-defined cluster of vertically adjacent pels that is situated within each column of vertically contiguous pels situated within said one block as input to a pre-defined look-up table to determine an output count for said column, wherein said output count represents the number of pels in said column that have said common binary value;

accumulating the output count for every successive column in said block to provide the grey scale value corresponding to said one block; and repeating said forming and determining steps for every successive one of said horizontal strips occurring in said bit-mapped pattern in order to vertically sequence through said bit-mapped pattern and generate corresponding lines of grey scale output values for each successive one of said strips so as to generate the "preview" image.

2. The method in claim 1 wherein said pre-defined look-up table comprises a plurality of separate pre-defined look-up tables, and said successively applying step comprises the steps of: applying said each pre-defined cluster of vertically adjacent pels as input to a different corresponding one of said plurality of separate pre-defined look-up tables, and additively combining output values produced by said plurality of pre-defined look-up tables in order to produce said output count.

3. The method in claim 2 wherein said bit-mapped pattern is a bit-mapped halftoned document.

4. The method in claim 3 wherein said bit-mapped halftoned pattern is encoded as a print file in CDPF format.

5. The method in claim 4 further comprised of the steps of:

reading a pre-defined number of vertically contiguous and horizontally oriented sections of eight-bit vertically aligned pel scans from said print file, wherein said sections form a corresponding one of said strips in said pattern;

storing each one of said sections in a corresponding one of a plurality of input buffers;

pointing to one of said scans stored within each of said input buffers, all of said one scans being vertically contiguous in said one strip;

forming individual clusters of different successively occurring pels that collectively form all of said one scans, such that said individual clusters can be successively grouped to collectively form a pre-defined number of columns of vertically contiguous pels equal to the number of horizontal lines of successive grey-scale values in said strip of said "preview" image;

applying at least the pels that comprise each of said individual clusters to a different corresponding one of said plurality of separate pre-defined look-up tables so as to provide a count of the number of pels in said each individual cluster that have said common binary value; and summing the counts produced by various ones of said plurality of separate pre-defined look-up tables to form corresponding ones of said output counts.

6. The method in claim 5 wherein each of the separate pre-defined look-up tables provides a count of the number of pels in a corresponding one of said individual clusters of pels that are darkened.

7. The method in claim 6 further comprising the steps of:

determining the associated grey scale value for each block in a group of vertically contiguous blocks in one of said strips;

pointing to a column in an output buffer;

loading the associated grey scale value obtained for each one of said blocks in said group into a separate corresponding location in said pointed column in the output buffer; and incrementing the output pointer to point to a next successive column in said output buffer.

8. The method in claim 7 wherein each of the blocks is square shaped and the corresponding number of lines of grey-scale values produces for any one of said strips in said bit-mapped pattern is given by the expression $8*M/n$, where, for a chosen value of n equalling a number of pels situated in each direction of one of said blocks, M is the number of vertical eight-bit bytes existing in said one strip and is the least number of eight-bit bytes whose bits are divisible by n.

9. The method in claim 8 wherein said bit mapped pattern is a bit-mapped halftoned separation.

10. In a system that provides a high resolution bit-mapped pattern formed of single bit pels, apparatus for generating a reduced resolution grey scale "preview" image from said bit-mapped pattern wherein the "preview" image substantially depicts how the bit-mapped pattern would appear when printed at said high resolution, said apparatus comprising:

means for forming successive groups of a pre-defined number of vertically contiguous blocks of pels from said bit-mapped pattern, such that said groups are arranged horizontally across said pattern and form one of a plurality of contiguous horizontal strips of said bit-mapped pattern, wherein each block has a pre-determined number of pels that exist within said bit-mapped pattern;

means for determining a corresponding multi-bit grey scale value, in response to the number of pels that have a common binary value and are situated in each one of said blocks in said one strip, so as to produce a corresponding number of horizontal lines of successive grey-scale values in said "preview" image such that each of said grey scale values corresponds to a different one of said blocks and said grey scale values occur in the same order as said blocks corresponding thereto, wherein said determining means comprises:

means for successively applying each pre-defined cluster of vertically adjacent pels that is situated within each column of vertically contiguous pels situated within said one block as input to a pre-defined look-up table to determine an output count for said column, wherein said output count represents the number of pels in said column that have said common binary value;

means for accumulating the output count for every successive column in said block to provide the grey scale value corresponding to said one block; and means for causing said forming and determining means to vertically sequence through said bit-mapped pattern for every successive one of said horizontal strips occurring in said bit-mapped pattern in order to generate corresponding lines of grey scale output values for each successive one of said strips and thereby generate the "preview" image.

11. The apparatus in claim 10 wherein said pre-defined look-up table comprises a plurality of separate pre-defined look-up tables, and said successively applying means comprises: means for applying said each pre-defined cluster of vertically adjacent pels as input to a different corresponding one of said plurality of separate pre-defined look-up tables, and means for additively combining output values produced by said plurality of pre-defined look-up tables in order to produce said output count.

12. The apparatus in claim 11 wherein said bit-mapped pattern is a bit-mapped halftoned document.

13. The apparatus in claim 12 wherein said bit-mapped halftoned pattern is encoded as a print file in CDPF format.

14. The apparatus in claim 13 further comprising:
means for reading a pre-defined number of vertically contiguous and horizontally oriented sections of eight-bit vertically aligned pel scans from said print file, wherein said sections form a corresponding one of said strips in said pattern;

a corresponding one of a plurality of input buffers for storing each one of said sections;

means for pointing to one of said scans stored within each of said input buffers, all of said one scans being vertically contiguous in said one strip;

means for forming individual clusters of different successively occurring pels that collectively form all of said one scans, such that said individual clusters can be successively grouped to collectively form a pre-defined number of columns of vertically contiguous pels equal to the number of horizontal lines of successive grey-scale values in said strip of said "preview" image;

means for applying at least the pels that comprise each of said individual clusters to a different corresponding one of said plurality of separate pre-defined look-up tables so as to provide a count of the number of pels in said each individual cluster that have said common binary value; and means for summing the counts produced by various ones of said plurality of separate pre-defined look-up tables to form corresponding ones of said output counts.

15. The apparatus in claim 14 wherein each of the separate pre-defined look-up tables provides a count of the number of pels in a corresponding one of said individual clusters of pels that are darkened.

16. The apparatus in claim 15 further comprising:
means for determining the associated grey scale value for each block in a group of vertically contiguous blocks in one of said strips;

an output buffer;

means for pointing to a column in the output buffer;

means for loading the associated grey scale value obtained for each one of said blocks in said group into a separate corresponding location in said pointed column in the output buffer; and means for incrementing the output pointer to point to a next successive column in said output buffer.

17. The apparatus in claim 16 wherein each of said blocks is square shaped and the corresponding number of lines of grey-scale values produced for any one of said strips in said bit-mapped pattern is given by the expression 8*M/n, where, for a chosen value of n equalling a number of pels situated in each direction of one of said blocks, M is the number of vertical eight-bit bytes existing in said one strip and is the least number of eight-bit bytes whose bits are divisible by n.

18. The apparatus in claim 17 wherein said bit mapped pattern is a bit-mapped halftoned separation.

* * * * *